United States Patent [19]

Szuba

[11] Patent Number: 5,388,685
[45] Date of Patent: Feb. 14, 1995

[54] ENDLESS CONVEYOR

[75] Inventor: Philip S. Szuba, Clinton Township, Macomb County, Mich.

[73] Assignee: Litton Industrial Automation Systems, Inc., Florence, Ky.

[21] Appl. No.: 178,031

[22] Filed: Jan. 6, 1994

[51] Int. Cl.⁶ .................................. B65G 47/84
[52] U.S. Cl. ........................ 198/803.2; 198/832; 198/834; 198/842
[58] Field of Search ................... 198/465.1–465.3, 198/803.01, 803.2, 832, 834, 842

[56] References Cited

U.S. PATENT DOCUMENTS

| | | | |
|---|---|---|---|
| 2,932,381 | 4/1960 | Kinnicutt et al. | 198/834 |
| 4,037,334 | 7/1977 | Plemitscher | 198/834 |
| 4,825,999 | 5/1989 | Hammer | 198/834 |
| 4,934,515 | 6/1990 | Linden | 198/803.2 |
| 5,029,691 | 7/1991 | Fein et al. | 198/465.3 |
| 5,188,219 | 2/1993 | Mitsumoto | 198/834 |

*Primary Examiner*—Joseph E. Valenza
*Attorney, Agent, or Firm*—Barnes, Kisselle, Riasch, Choate, Whittemore & Hulbert

[57] ABSTRACT

A conveyor and method for preventing stick-slip friction conditions from exciting the conveyor into surging and for preventing surging vibration from adversely affecting operation of the conveyor. The conveyor has a pair of endless, flexible roller chains that are laterally spaced apart and carried on sprockets keyed to a drive shaft that is in communication with a drive at one end of the frame and sprockets keyed to a take-up shaft at the opposite end of the frame. Preferably, the take-up shaft is split into two shaft sections rotatively secured adjacent their ends by a pair of bearings on a mounting block to permit each conveyor chain to move on its idle sprocket independently of the other chain. The conveyor components are selected to provide a combination of chain stiffness and conveyor mass moment of inertia at maximum payload that produces a conveyor having a high enough natural frequency to prevent stick-slip friction conditions from exciting the conveyor chains into surging. Should a conveyor possess a natural frequency falling within the range of natural frequencies causing the conveyor to be susceptible to surging, a dampener that includes a flywheel disc coupled to the conveyor take-up shaft by a spring is attached to one or preferably both ends of the take-up shaft of the conveyor for preventing stick-slip from exciting the conveyor chains into surging and reducing the amplitude of any surging vibrations which might occur so they do not adversely affect operation of the conveyor.

42 Claims, 5 Drawing Sheets

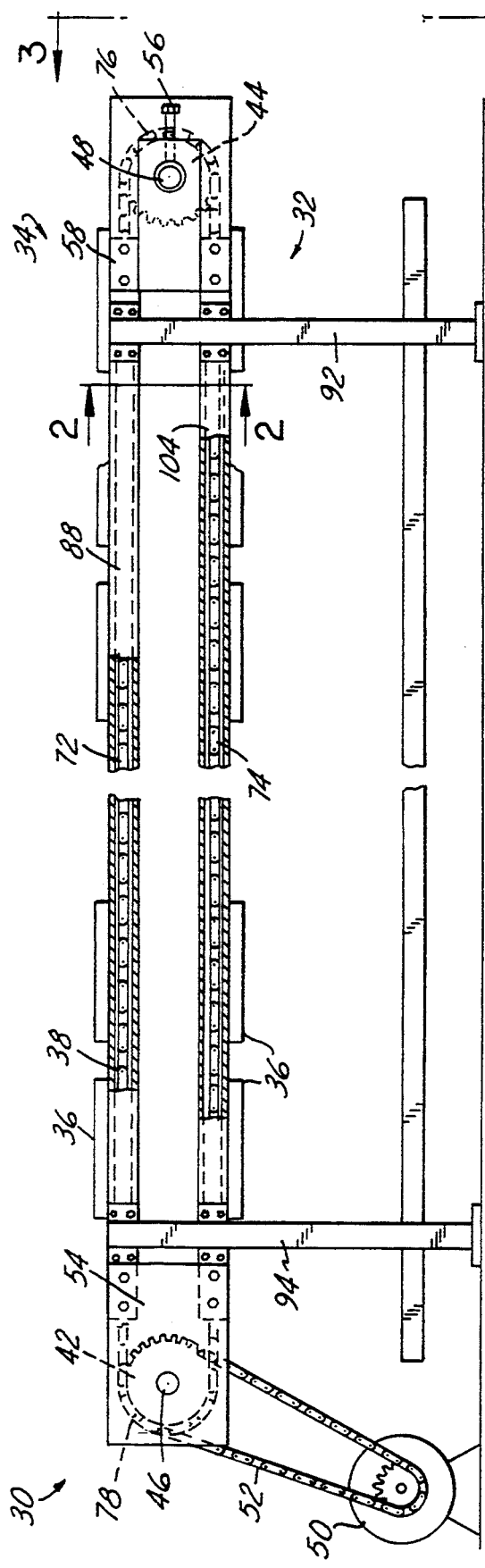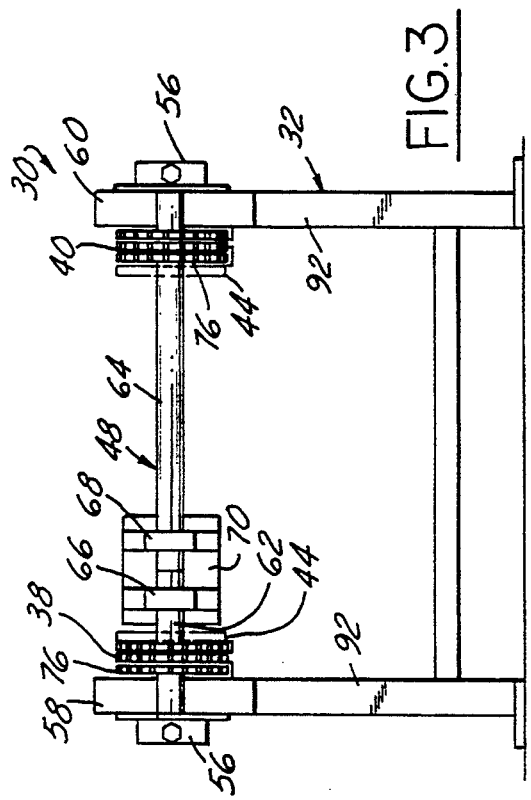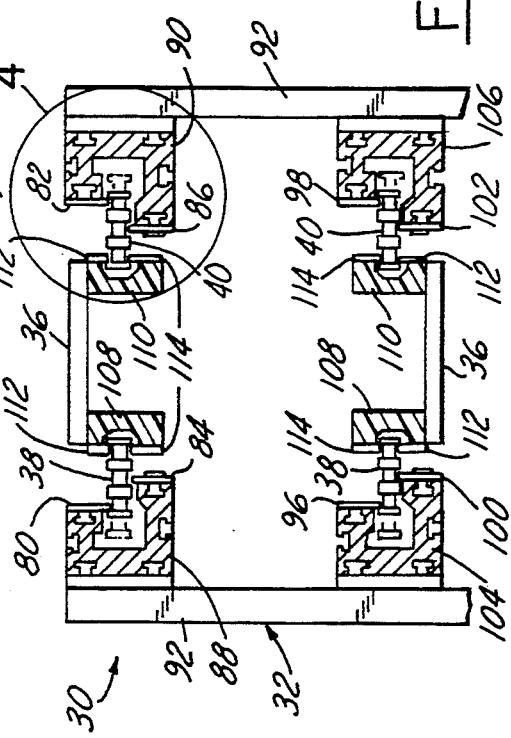

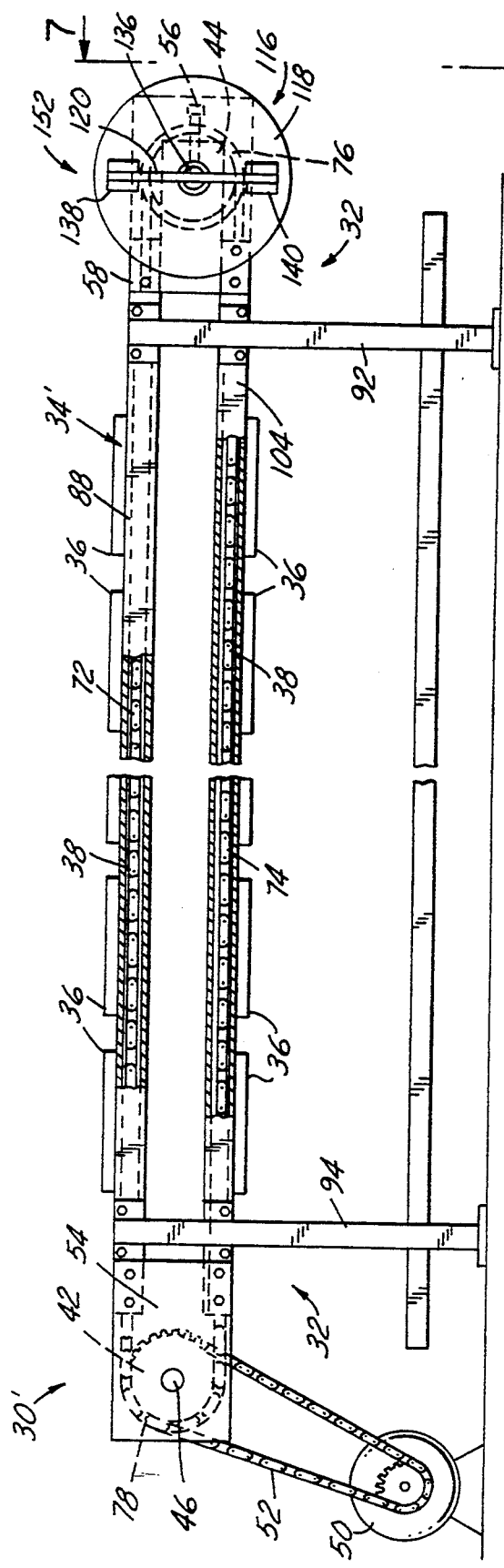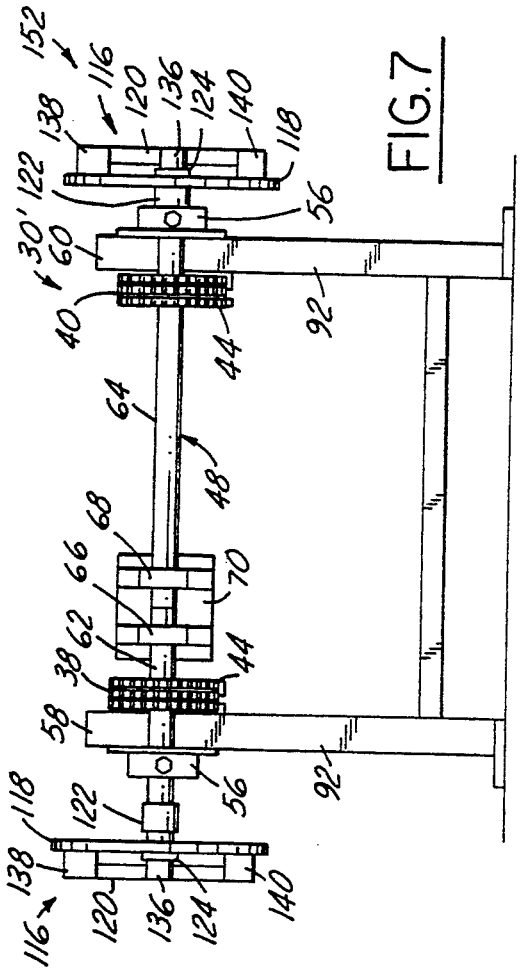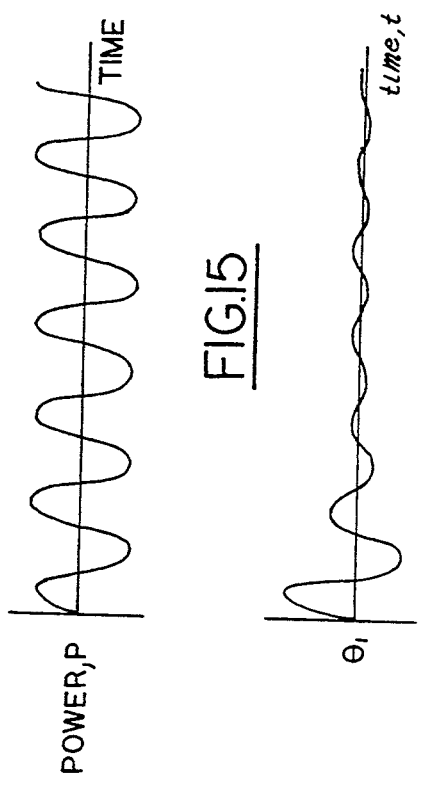

ENDLESS CONVEYOR

FIELD OF THE INVENTION

This invention relates to an endless conveyor for transporting articles of manufacture and more particularly to a method and conveyor which reduces the amplitude of surging during operation.

BACKGROUND OF THE INVENTION

In manufacturing, conveyors are commonly used to transport workpieces from workstation to workstation where manufacturing operations are performed on each workpiece. Typically, these conveyors consist of a pair of laterally spaced apart chains in closed loops that are carried by sprockets on a shaft at each end of the loop. Each chain is slidably guided and supported by a support rail attached to the conveyor frame. In operation, the chains are operably connected to several pallets, usually enough to fill the conveyor, carrying workpieces to transport the workpieces from station to station. In this fashion, the conveyor also serves as a storage system for the pallets and workpieces.

A long-standing problem with chain and even belt-type conveyors that are long, heavily loaded, and/or operate at slow speeds is the phenomena known as "surging" which generally manifests itself in the conveyor moving in a visually noticeable, jerking manner. This surging of the conveyor is highly undesirable since it can cause excessive wear and premature failure of the chains, sprockets, and other components of the conveyor. It is especially intolerable where a slow and stable assembly line speed is required for safe transportation of pallets and workpieces along an assembly line.

Surging appears to be caused by an operating condition known as "stick-slip" where at least one portion of a conveyor chain alternately decelerates and accelerates due to friction between the chain and guide rail and because the chain behaves like a massive spring alternately storing and releasing energy as the chain sticks and slips. Stick-slip in conveyors has been more specifically referred to as "harmonic oscillation stick-slip" because during surging it has been found that a conveyor chain will surge at a specific frequency which varies only slightly with changing lubrication conditions and the location of the load on a given conveyor.

To prevent surging, designers have generally limited conveyor lengths to less than 30 feet and chain speeds to greater than 50 feet per minute. As a result of these limitations, long manufacturing lines requiring a payload of pallets and workpieces to be transported at a relatively slow speed over long distances typically have used a series of short conveyors with expensive load-unload transfer mechanisms between conveyors to transfer the pallets and workpieces between each adjacent pair of conveyors. This solution to preventing surging is highly undesirable because it dramatically increases the cost and complexity of the conveyor line while decreasing its reliability.

It is also not uncommon for a conveyor that has operated without incident in the past to encounter surging, especially where operating conditions such as speed, payload or payload position have changed. Common solutions to eliminate or prevent surging in existing conveyors have been to reduce the payload transported by the conveyor or suitably increase the speed of the conveyor. Since a conveyor in this situation is usually preferably driven at close to the optimum speed at which manufacturing operations at each station can be performed, the conveyor speed is increased and/or the payload is typically reduced to avoid surging. Unfortunately, where the conveyor payload has been reduced by lessening the number of pallets and workpieces transported by the conveyor, the efficiency of the assembly line is reduced and manufacturing costs are increased.

To maintain assembly line efficiency while preventing or eliminating surging, a number of other post-installation solutions have been proposed and implemented on conveyors with little success. For example, one previously used solution has been to substitute a bearing roller chain for each roller chain commonly used in these conveyors. Although, this type of chain can allow more stable conveyor operation at a lower speed, it is considerably more expensive than conventional roller chain and is also susceptible to surging at extremely low conveyor speeds and/or long lengths.

Another solution proposed and tried with extremely limited success has been to increase conveyor chain tension. Although in some instances increasing chain tension can prevent the onset of surging, it does not prevent surging under most operating conditions. It has been found that adjusting chain tension successfully prevents surging only for a relatively narrow band of unchanging operating conditions. For example, although a particular preset chain tension may successfully prevent the onset of surging when the conveyor is transporting a specific number of pallets, surging frequently returns should the payload change or the position of the payload shift. This solution, therefore, is impractical since conveyor load and position typically do not remain unchanged during actual operating conditions.

A still further proposed solution has been to add a brake to the tail end of the conveyor opposite the drive shaft to continuously dissipate energy for preventing surging. Unfortunately, while brakes have been found to prevent the onset of surging under an extremely narrow range of conveyor operating conditions, they also do not consistently prevent surging under the wide variety of conditions generally encountered during actual conveyor operation.

Another unrecognized problem contributing to surging in over-under conveyors having a pair of spaced apart chains is the presence of a second, higher frequency, vibration during conveyor operation. In a conveyor also experiencing surging, this vibration can constructively and destructively interfere with the vibration associated with surging, increasing the amplitude of surging in one portion of one or both chains and lessening it another portion further increasing wear and tear on the conveyor.

SUMMARY OF THE INVENTION

A conveyor and method for preventing stick-slip friction conditions from exciting the conveyor into surging and for preventing surging vibration from adversely affecting operation of the conveyor. The conveyor has an endless, flexible roller chain in a closed loop received on laterally spaced apart drive and idle sprockets at opposite ends of the loop. If the conveyor has two or more loops of chain, each idle sprocket is independently journalled to prevent torsion-induced windup, which can occur with a common take-up shaft during operation, from exciting the shaft and causing a vibration to be transmitted to one or more of the chains. To prevent surging, each chain and idle sprocket is constructed and arranged to have a mass moment of inertia and spring rate that provides the conveyor with a suitably high natural frequency for preventing surging vibration from adversely interfering with the operation of the conveyor. Preferably, each chain is of sufficient stiffness to produce a conveyor apparatus having a natural frequency much higher than the typical range of known natural frequencies at which a conveyor is susceptible to surging for preventing stick-slip from exciting the conveyor into surging during operation even when fully loaded with pallets and workpieces.

In the design of such a conveyor, the inertia and spring rate of the conveyor are determined and its natural frequency is calculated. If the natural frequency of the conveyor falls within the known range of natural frequencies at which the conveyor would be susceptible to surging, either the stiffness of each conveyor chain is increased or the inertia of the conveyor is decreased by reducing its maximum payload or decreasing the mass of each chain. Preferably, if it is necessary to increase the natural frequency of the conveyor, the stiffness of the proposed chain is increased by increasing either its cross-sectional area or by selecting a chain material possessing a higher Young's modulus. Since most, if not virtually all, chains are constructed of steel having a Young's modulus of $30*10^6$ pounds per square inch, the cross-sectional area of the chain is typically varied by the conveyor designer to produce a chain having the desired stiffness. When the combination of chain stiffness and conveyor inertia yield a conveyor natural frequency that is sufficiently higher than the upper frequencies of the natural frequency range at which the conveyor could be susceptible to surging, the conveyor is constructed preferably with off-the-shelf components that provide the desired inertia and stiffness during actual conveyor operation.

Should an existing conveyor experience surging, a separate surge dampener may be attached to each idle sprocket of each chain to dramatically reduce or even virtually eliminate the amplitude of surging. The dampener comprises a flywheel disc coupled to the idle sprocket by a spring and has a natural frequency that is tuned to the frequency at which the conveyor is surging. If desired, the surge dampener can be mounted on conveyors not experiencing surging as a precaution to prevent the occurrence of surging, especially where the natural frequency of the conveyor falls within the natural frequency range making it susceptible to surging, but is particularly well suited for retrofit use with conveyors that are experiencing surging during actual operation.

In the design of a surge dampener, the surge frequency of the conveyor without any dampener installed is preferably measured and the mass moment of inertia of the conveyor without any dampener installed is determined. To determine the mass moment of inertia of the dampener flywheel, the mass moment of inertia of the conveyor is multiplied by a predetermined inertia ratio that will provide the dampener with a sufficiently wide bandwidth of surge suppression for preventing surging from affecting the operation of the conveyor should the dampener not be precisely tuned to the surge frequency or should the conveyor natural frequency shift during operation. After determining the flywheel inertia, the mass and physical dimensions of the flywheel are determined for constructing the flywheel.

To tune the dampener to the surge frequency for minimizing the amplitude of surging, the spring rate of the dampener spring is chosen to impart to the dampener a natural frequency about equal to the surge frequency. Once the specifications of the dampener have been determined, the two new natural frequencies of the conveyor and dampener together are determined to ensure that the conveyor with the dampener installed does not operate at a speed that results in vibration at either new natural frequency.

Objects, features and advantages of this invention are to provide a conveyor which is resistant to stick-slip exciting the conveyor into surging, minimizes the amplitude of surging as a result of being constructed having a natural frequency that is higher than the surge frequency range and prevents torsion wind-up in the take-up and/or drive shaft from inducing vibration in the shaft and transmitting the vibration to each chain during operation; having a flywheel surge dampener which prevents stick-slip from exciting the conveyor into surging and minimizes the amplitude of any surging and both of which are rugged, durable, of simple design, of economical manufacture and easy to assemble and use.

BRIEF DESCRIPTION OF THE DRAWINGS

These and other objects, features and advantages of this invention will be apparent from the following detailed description of the best mode, appended claims, and accompanying drawings in which:

FIG. 1 is a side view, with parts broken away, of an endless conveyor apparatus embodying this invention;

FIG. 2 is an enlarged sectional view of the conveyor taken along line 2—2 of FIG. 1;

FIG. 3 is an end view of the conveyor viewed along line 3—3 of FIG. 1;

FIG. 6 is a side view, with parts broken away, of a second endless conveyor apparatus embodying this invention;

FIG. 7 is an end view of the second conveyor taken along line 7—7 of FIG. 6;

FIG. 15 is a plot of conveyor power usage over time for a conveyor experiencing surging illustrating that the fluctuating power usage during surging corresponds to the frequency of surging of the conveyor; and FIG. 16 is a plot of surging amplitude over time of a conveyor experiencing surging illustrating the critical damping effect of the surge dampener on the amplitude of surging.

DETAILED DESCRIPTION OF THE INVENTION

Figure 4:
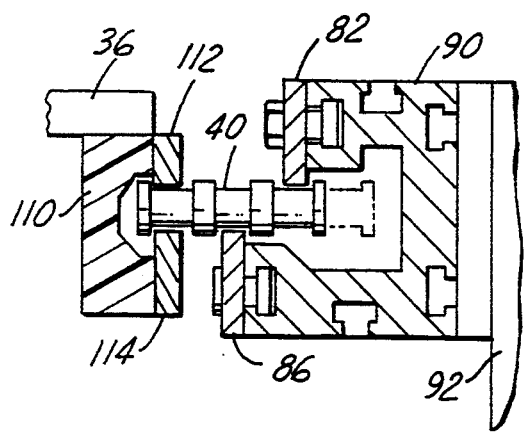
FIG. 4 is an enlarged fragmentary view of that portion of FIG.2 of the conveyor enclosed by the circle 4.

FIG. 1 illustrates an over-under type conveyor apparatus 30 having a frame 32 supporting an endless accumulating conveyor 34 for transporting pallets 36 carrying workpieces thereon along an assembly line (not shown). The conveyor 34 comprises a pair of endless, flexible roller chains 38 & 40 in closed loops that are laterally spaced apart by and carried on drive sprockets 42 which are preferably keyed to a drive shaft 46 at one end of the frame 32 and take-up or idle sprockets 44 which are preferably keyed to a tail or take-up shaft 48 at the opposite end of the frame 32. The conveyor chains 38, 40 are driven by a preferably electric motor drive 50 that is operably connected to a sprocket (not shown) keyed to the drive shaft 46 by an endless flexible member 52 such as a chain or belt.

The drive shaft 46 is a transverse horizontal shaft that is journalled for rotation in a pair of pillow blocks mounted to plates 54 secured to one end of the frame 32, only one of which is shown in FIG. 1. To facilitate movement of the chains 38, 40 during operation, the take-up shaft 48 is also journalled for rotation in pillow blocks mounted to plates 58 & 60 secured to the frame 32 at the opposite end. As is shown more clearly in FIG. 3, the take-up shaft 48 is preferably split into two shaft sections 62 & 64 that are journalled adjacent their innermost ends by a pair of bearings 66 & 68 carried by a mounting block 70 to permit each conveyor chain to move on its idle sprocket 44 independently of the other chain for preventing torsion-induced windup of the take-up shaft 48 and/or drive shaft 46 during conveyor operation from exciting the shaft at its torsional frequency and causing a vibration to be transmitted to one or both chains 38, 40. By independently journalling each idle sprocket 44, torsion-induced windup of the take-up shaft 48 and/or drive shaft 46, such as caused by unequal chain lengths and/or imperfectly matched idle and/or drive sprockets, is prevented because the chains 38, 40 can move relative to each other.

As is shown in FIGS. 2 & 3, preferably each chain 38, 40 is an endless 3-strand or 4-strand (the 4th strand is shown in phantom in FIGS. 2, 4 & 5) roller chain. Each chain 38, 40 extends over the drive and idle sprockets 42 & 44, respectively, with the sprocket teeth engaging between the rollers of the two outermost strands of each 3-strand chain or the two middle strands of each 4-strand chain. As is shown more clearly in FIG. 1, each chain 38, 40 has an upper run 72 and a lower run 74 connected by curved sections 76 & 78 extending around the sprockets 42, 44 on shafts 46, 48. The conveyor has a chain tensioning device 56 adjacent each idle sprocket 44 and in communication with chains 38 & 40 for enabling adjustment of the tension of each chain. Preferably, during conveyor operation each chain tensioning device 56 is isolated from the chain it is associated with to prevent adding an additional degree of freedom to the conveyor and increasing the amplitude of surging vibration.

The upper runs 72 of the two chains 38, 40 are horizontal and parallel to one another, and are guided and supported by horizontal guide rails 80, 82, 84 & 86 connected to upper rail extrusions 88 & 90 which are in turn attached to legs 92 & 94 extending vertically upwardly from the floor. As is shown more clearly in FIG. 2, rails 84 & 86 bear against the underside of the middle strand of the 3-strand chains 38, 40, while rails 80 & 82 abut against the top of the outermost chain strands for slidably guiding the chains 38, 40 along the conveyor 34 and cantilevering the chains 38, 40 therefrom for enabling the pallets 36 to be supported on the innermost chain strands during operation.

The lower chain runs 74 are also horizontal and parallel to one another, and are guided and supported by horizontal guide rails 96, 98, 100 & 102 connected to lower rail extrusions 104, 106 which are attached to the conveyor frame 32 by legs 92 & 94. Rails 100 & 102 bear against the underside of the middle strand of the 3-strand chains while rails 96 & 98 abut against the outermost strand for slidably guiding the chains along the rails and cantilevering the chains therefrom for enabling the pallets 36 to be supported on the innermost chain strands during operation of the conveyor 34.

The conveyor apparatus 30 is designed to slidably support and locate the pallets 36 and transport them over both the upper and lower runs 72, 74. The pallets 36 have a pair of spaced apart shoes 108 & 110 attached to the underside thereof. Each shoe has a pair of vertically spaced apart guide bars 112 & 114 which are parallel to one another and extend lengthwise of the pallet 36. As is illustrated most clearly in FIG. 2, when a pallet 36 is operably connected to the upper runs 72 of the two chains 38, 40, the upper guide bars 112 of each pallet shoe 108, 110 ride on the innermost strands of the chains. When a pallet 36 is operably supported on the lower chain runs 74, the pallet 36 is inverted and the lower guide bars 114 ride on the rollers of the innermost strands of the two chains 38, 40.

Preferably, each pallet 36 is propelled around each end of the loops of chain by the cooperation of a yieldably biased detent (not shown), carried by the pallet 36, with a sprocket (not shown), carried by the drive shaft 46 at one end and the take-up shaft 48 at the other end for rotation therewith. Preferably, the conveyor as thus far described is constructed in accordance with U.S. Pat. No. 4,934,515, the disclosure of which is incorporated herein by reference and hence will not be described in further detail.

In accordance with this invention, a conveyor apparatus 30 having a chain 38, 40 in closed loop of a length preferably greater than eighty feet and able to transport pallets 36 at extremely low chain speeds, typically less than fifty feet per minute, while being virtually immune to surging, is constructed to have a natural frequency that is much higher than a range of known natural frequencies wherein a conveyor would be susceptible to surging to prevent stick-slip friction conditions between each chain and its guide rails from exciting the conveyor 34 into surging. To construct a conveyor apparatus 30 having these surge-resistant characteristics, the mass moment of inertia of the conveyor 34 and stiffness or spring rate of each chain 38, 40 must be chosen to impart to the conveyor 34 a suitably high natural frequency to ensure stability during operation even while encountering widely varying loading conditions that can change the natural frequency of the conveyor 34.

Conveyor Design

A conveyor apparatus 30 as is illustrated in FIGS. 1-4 having an anti-surging construction can be modeled as a system with a single degree of freedom and therefore be described using the following single differential equation of motion:

$$I_1\ddot{\theta}_1 + k_1\theta_1 = 0 \qquad \text{(Equation I)}$$

where:
- $\theta_1$ indicates the angular displacement of the idle sprocket 44;
- $I_1$ is the equivalent mass moment of inertia of the conveyor 34 about the center of the idle sprocket 44; and
- $k_1$ is the stiffness of the conveyor 34, i.e. the spring rate of the chain 38 or 40.

As a single degree of freedom system, the conveyor 34 is approximated as being capable of vibrating at only one natural frequency at a given time; although in actual operation the conveyor 34 vibrates at many different frequencies and amplitudes but can resonate with a rather large amplitude at or around its fundamental natural frequency, $W_{11}$, (i.e. mode shape=1 or its fundamental mode) if excited during operation.

When excited by a forcing function, F(t), the conveyor apparatus 30 can be further defined by slightly modifying equation I to be:

$$I_1\ddot{\theta}_1 + k_1\theta_1 = F(t) \qquad \text{(Equation II)}$$

When a conveyor is operated at a relatively slow speed (usually less than fifty linear feet per minute), especially during start-up, friction conditions between the conveyor chains 38, 40 and guide rails can cause stick-slip to occur resulting in the chains 38, 40 moving jerkily at an uneven velocity. If the natural frequency of a long conveyor (usually more than thirty feet) is too low, typically within a known natural frequency range of about 0 hertz to less than about 12 hertz, stick-slip can act as the forcing function, F(t), to excite the chains 38, 40 into behaving like springs, alternately storing and releasing energy, causing the conveyor to continuously surge. In general, a conveyor having a natural frequency that falls within this natural frequency range of about 0–12 hertz and experiencing stick-slip will surge at a particular and generally constant frequency, $W_s$, which can be equal to the natural frequency, $W_{11}$, of the conveyor but usually varies with respect to the conveyor natural frequency, $W_{11}$, because $W_{11}$ can change during operation due to frequently changing conveyor loading conditions.

The natural frequency of the conveyor apparatus 30 can be determined knowing the stiffness or spring rate, $k_1$, of chain 38, 40 with respect to the center of the idle sprocket 44 and the mass moment of inertia, $I_1$, of the conveyor 34:

$$w_{11} = \sqrt{\frac{k_1}{I_1}} \qquad \text{(Equation III)}$$

To prevent stick-slip from exciting the conveyor 34 into surging and surging from adversely affecting operation of the conveyor 34, the conveyor apparatus 30 has a desirable ratio of chain stiffness to mass moment of inertia of conveyor 34, $k_1/I_1$, greater than about 144 sec$^{-2}$ or 904.7 rad/sec$^2$ and preferably greater than about 400 sec$^{-2}$ or 2,513 rad/sec$^2$, to impart to the conveyor apparatus 30 a safe, relatively high natural frequency that is well above the natural frequency range at which a long conveyor is susceptible to surging and preferably greater than twenty hertz. Preferably, the conveyor 34 has stiff chains 38, 40 of relatively low mass to impart to the conveyor apparatus 30 a high natural frequency for preventing surging from adversely affecting operation even when the conveyor 34 is experiencing stick-slip and fully loaded with pallets 36 and workpieces.

In the construction of a conveyor apparatus 30 of this invention, two parameters can be varied to obtain a high, surge resistant conveyor natural frequency; namely the mass moment of inertia, $I_1$, of the conveyor 34 and the stiffness, $k_1$, of each chain 38, 40. For the conveyor apparatus 30 illustrated in FIGS. 1-4, the mass moment of inertia, $I_1$, of the conveyor 34 is preferably first determined in order to calculate $W_{11}$:

$$I_1 = m_a r_s^2 + \tfrac{1}{2} m_s r_s^2 \qquad \text{(Equation IV)}$$

where:
- $I_1$ is the mass moment of inertia of the conveyor 34;
  (1) in the case of a conveyor having a split take-up shaft 48, it is the equivalent mass moment of inertia of one of the idle sprockets 44 including the mass moment of inertia contributed by chain 40 on sprocket 44 and one-half the mass moment of inertia contributed by the conveyor payload of pallets 36 and workpieces, and (2) in the case of a conveyor having a solid take-up shaft, it is the equivalent mass moment of inertia of both idle sprockets 44 including the mass moment of inertia contributed by both chains 38, 40 and the payload of pallets 36 and workpieces since the solid take-up shaft links both chains together;
- $m_a$ is the apparent mass that the pallets 36 and chain contribute to the idle sprocket 44; (1) for a conveyor having a split take-up shaft, the apparent mass includes the mass of one chain and one-half of the mass of the entire payload of pallets 36 and workpieces, and (2) for a conveyor having a solid take-up shaft, it includes the mass of both chains and the mass of the entire payload of pallets and workpieces;
- $r_s$ is the radius of the idle sprocket(s) 44; and
- $m_s$ is the mass of the idle sprocket 44 (typically $m_s << m_a$); (1) for a conveyor having a split take-up shaft it is the actual mass of only one idle sprocket, and (2) for a conveyor having a solid take-up shaft, it includes the actual mass of both idle sprockets.

The first part of equation IV is used to calculate the mass moment of inertia of the conveyor load, namely, the apparent mass that is transmitted to the idle sprocket 44 of the conveyor apparatus 30 by its payload of pallets 36 and workpieces and chain or chains. The second part of the equation includes the mass moment of inertia contributed by the disc-shaped sprocket 44 or sprockets 44. During operation, the sprocket 44 is in operable communication with a chain 40 carrying the payload of pallets 36 and workpieces thereon making the sprocket 44 appear as a disc of larger mass when calculating its mass moment of inertia. Therefore, equation IV not only includes the actual mass moment of inertia of the sprocket 44, but also inertia contributed by the chain 40 and conveyor payload, including pallets 36, reflected about the sprocket 44. As a result, the apparent mass, $m_a$, that the sprocket 44 experiences includes the equivalent mass of the force transmitted to the sprocket 44 as a result of friction between the chain 40 and guide rails 82, 86 and the chain 40 and pallets 36.

In most cases, the mass, $m_s$, of the sprocket 44 is small relative to the apparent mass contributed by the chain 40 and one-half of the conveyor payload and can be neglected when calculating $I_1$.

After simplification, equation IV becomes:

$$I_1 = \frac{(\mu N_p + \frac{1}{2}W_s)r_s^2}{g} \approx \frac{\mu N_p r_s^2}{g} \quad \text{(Equation V)}$$

where:
- $\mu$ is the dimensionless coefficient of friction between the chain 40 and guide rails 82, 86 and between the chain 40 and pallets 36;
- $N_p$ is the sum of the normal forces exerted on the guide rails by chain 40 and the normal force exerted on chain 40 by one-half the payload of pallets 36 and workpieces for a conveyor having a split take-up shaft; for a conveyor having a solid take-up shaft, $N_p$, includes the sum of the normal forces exerted on the guide rails by both conveyor chains 38, 40 and the normal force exerted on the chains by the entire payload of pallets 36 and workpieces;
- $W_s$ is the actual weight of the sprocket 44; or of both sprockets if the conveyor has a solid take-up shaft, and
- g is a conversion factor converting force to mass; e.g., lbf. to lbm.

Since, for the case of a conveyor having a split take-up shaft, the chain 40 is in frictional contact with more than one guide rail, as is shown in FIGS. 2 & 4, and transports pallets 36 which also can contribute to the frictional force transmitted to the idle sprocket 44 when the conveyor 34 accumulates pallets 36 at either end or at workstations along the conveyor 34, the sum of normal forces, $N_p$, bearing on the chain 40 is not just simply the weight of the chain 40 and one-half of the payload weight. Rather, it is a function of the geometry of the conveyor guide rails, chains and pallets and the contact therebetween and for conveyor 34 is dependent upon the contact between the chain 40 and guide rails 82, 86 and the chain 40 and pallets 36. As a result, for a conveyor apparatus 30 that is oriented horizontally as is shown in FIGS. 1–4, equation V can be written as:

$$I_1 \approx \frac{\mu n W_p r_s^2}{g} \quad \text{(Equation VIa)}$$

where:
- n is a dimensionless force multiplier dependent upon the contact between the chain 40 and guide rails 82, 86 and the chain 40 and pallets 36; and
- $W_p$ is the weight of the chain 40 and one-half of the payload for a conveyor having a split take-up shaft; for a conveyor having a solid shaft, $W_p$, includes the weight of both conveyor chains 38, 40 and the entire payload of pallets 36 and workpieces.

$$I_1 = \frac{\mu \eta W_c r_s^2}{2g} + \frac{\mu n W_{pp} r_s^2}{2g} \quad \text{(Eq. VIb)}$$

where:
- $\eta$ is a dimensionless force multiplier dependent upon the contact between the chain and underlying guide rails 82, 86; for a 3-strand chain, $\eta = 1$ because rail 86 (see FIGS. 4 & 5) supports chain 40 along its center links, uniformly balancing the chain 40 on this rail 86; for a 4 strand chain, by summing moments, $\eta$ is slightly greater than 1 because the chain 40 is not centered on the rail 86;
- n is a dimensionless force multiplier dependent upon the contact between the chain 40 and guide rails 82, 86 and the chain 40 and pallets 36;
- $W_c$ is the weight of one chain 40 for a conveyor having a split take-up shaft, or of both chains 38, 40 if the conveyor has a solid take-up shaft; and
- $W_{pp}$ is the weight of the conveyor payload of workpieces and pallets 36; (1) for a conveyor having a split take-up shaft, it is one-half the weight of the payload of workpieces and pallets 36, and (2) for a conveyor having a solid take-up shaft, $W_{pp}$, is the weight of the entire payload of pallets 36 and workpieces.

Figure 5:
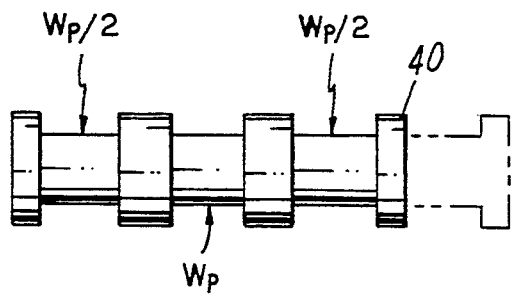
FIG. 5 is a free body diagram of forces applied to the chain illustrated in FIG. 4 during operation of the conveyor.

Referring additionally to FIG. 5, for the construction and arrangement shown, the force multiplier, n, of equations VIa and VIb is dependent upon the points of contact between the chain 40 and the conveyor guide rails 82, 86 supporting and guiding the chain 40 and between the chain 40 and pallets 36. Since the force of friction of a body in motion is $F_f = \mu N$ where $\mu$ equals the coefficient of friction between the chain 40 and guide rails 82, and the chain 40 and pallets 36 and N is the normal force of the body acting in a direction generally perpendicular to the direction of the friction force, $F_f$; the normal force, $N_p$, used in equation V is the sum of the individual normal forces between the chain 40 and guide rails 82, 86 and the chain 40 and pallets 36.

As is shown more clearly in FIGS. 2 & 4, the 3-strand chain 40 comes into contact with guide rails 82, 86 to support the chain 40 in a cantilevered manner as it carries the pallets 36 thereon and guides the chain 40 for transporting the pallets 36 along the generally horizontal conveyor 30 during operation. As is depicted in FIG. 4, the pallets 36, workpieces and chain 40, typically under the influence of gravity, exert a downward force of F (not shown) or more precisely $\frac{1}{2}W_p$. Referring additionally to FIG. 5, in summing the moments about the lower guide rail 86, the upper guide rail 82 in contact with the outermost chain link experiences a force of F or $\frac{1}{2}W_p$ and therefore also exerts a force of $\frac{1}{2}W_p$ against the outermost link. In summing the moments about the upper guide rail 82, the lower rail 86 exerts a force of 2F or $W_p$ against the middle chain link. Therefore, $N_p \sim 4F$ or $2W_p$ during conveyor operation and n=4 in the present case for a 3-strand roller chain 40 carrying pallets 36 that is supported by upper and lower guide rails 82, 86. Actually, n is slightly greater than 4 because the force exerted between the chain 40 and lower rail 86 also includes the weight of the chain. However, the weight of the chain is usually neglected in calculating conveyor mass moment of inertia, $I_1$, because it typically is small relative to the payload carried by the conveyor. Typically, n=4 for both a conveyor having a solid or split take-up shaft when using a 3-strand chain.

Of course, should the conveyor 34 be angled from the horizontal, the normal force of chain 40 and the payload, $N_p$, will be the component of the payload and chain weight, $W_p$, that bears generally perpendicularly against the guide rails 82 & 86. For the case of a 4-strand chain, n would be greater than 4 due to the additional weight and the location of the weight contributed to the payload, $W_p$, by the fourth strand shown in phantom in FIGS. 2, 4 & 5. The factor n, used in equation VIb, can be determined by determining the static forces exerted between the conveyor chain and guide rails and the chain and pallet in the manner previously illustrated above.

Preferably, the payload contributed by the pallets 36 and workpieces used in calculating the conveyor mass moment of inertia, $I_1$, is at least the maximum payload that the conveyor 34 is capable of transporting because this will provide the operating conditions where the conveyor apparatus 30 has the lowest natural frequency and is most susceptible to surging. Under these worst-case operating conditions, the calculated natural frequency of the conveyor apparatus 30 must be greater than the upper frequency of the natural frequency range and is preferably much greater, so that the potential for encountering surging during operation is eliminated and the conveyor 34 will not surge unless loaded well beyond its practical payload limit. This ensures that the natural frequency of the conveyor apparatus 30 will be even higher and the risk of surging even lower for lesser payloads typically encountered during actual operation.

To determine the natural frequency, $W_{11}$, of the conveyor apparatus 30, the linear spring rate, $k_{chain}$, of the chain 40 must also be determined and converted to its angular equivalent, $k_1$. The formula for determining the spring rate of the chain 40 is:

$$k_{chain} = \frac{AE}{L} \qquad \text{(Equation VII)}$$

where:
- $k_{chain}$ is the spring rate or spring constant of the conveyor chain;
- A is the average transverse cross-sectional area of the chain; (1) for a conveyor having a split take-up shaft, it is the average transverse cross-sectional area of one chain, and; (2) for a conveyor having a solid take-up shaft it is the average transverse cross-sectional area of both chains 38, 40.
- E is the Young's modulus of the chain, i.e. of its material of construction; and
- L is the length of the conveyor 34 from its drive shaft to the effective center of gravity of the payload; for a conveyor uniformly loaded on top, the center of gravity of the payload typically is at the midpoint of the conveyor.

Preferably, for a conveyor that is uniformly loaded with pallets and workpieces along its top run and having pallets accumulated along its bottom run, to determine L the workpiece/pallet ratio must first be determined. Should this ratio of the weight of one workpiece divided by the weight of one pallet be greater than about two, the location of the center of gravity of the payload at which the conveyor natural frequency will be the lowest and susceptibility for surging be the greatest will be at a location from the drive shaft of about one-half the length of the conveyor along the top run.

In this case, L will equal one-half the length of the conveyor when calculating $k_{chain}$.

However, should the ratio be less than about two, the location of the center of gravity of the payload at which the conveyor natural frequency will be the lowest and susceptibility for surging be the greatest will be at a distance from the drive shaft of about one and one-half times the length of the conveyor and located along the bottom run. In this case, L will equal one and one-half times the length of the conveyor when calculating $k_{chain}$.

Should it be necessary to more accurately calculate the location of the payload center of gravity or if conveyor loading conditions differ from that set forth above, the location of the center of gravity of the conveyor payload along the conveyor can be determined for a conveyor loading condition by summing individual pallet and/or workpiece masses multiplied by its distance from where the conveyor is driven, typically its drive shaft, and dividing the sum by the total mass of the payload.

The equation for converting $k_{chain}$ to its equivalent in angular units is:

$$k_1 = \frac{k_{chain} r_s}{\frac{s}{r_s}} \qquad \text{(Equation VIII)}$$

where:
- $k_1$ is the chain stiffness in angular units; and
- s is an arc length of one inch.

From equations V & VI it can be seen that the natural frequency, $W_{11}$, of the conveyor apparatus 30 will be highest if the chains 38, 40 have a relatively high spring rate or stiffness, $k_1$, and/or if the mass moment of inertia, $I_1$, of the conveyor 30 is minimized. Where initial calculations indicate that the natural frequency of a proposed conveyor design falls within the natural frequency range (0–12 hertz) making it susceptible to surging, it is generally preferable to increase the stiffness of the chains 38, 40 rather than reduce inertia, $I_1$, since reducing the inertia would likely produce a conveyor having reduced payload capacity. To increase natural frequency, $W_{11}$, it is preferable, therefore, to select a more massive, stiffer chain having a higher spring rate since a less massive chain generally will have a lower spring rate and a decreased payload capacity. To increase the natural frequency, $W_{11}$, and stability of the conveyor 34 by increasing the stiffness of each conveyor chain, the cross-sectional area, A, and/or Young's modulus, E, of each chain can be suitably increased until the desired natural frequency is achieved. Since most chains are made of steel having a Young's modulus of $30*10^6$ pounds per square inch, the cross sectional area of the chain is preferably varied until the desired high conveyor natural frequency is reached.

Preferably, the conveyor design is finalized when the natural frequency of the conveyor apparatus 30, at its theoretical maximum payload, is well above the natural frequency range where it would be susceptible to surging. Preferably, after determining the desirable chain characteristics utilizing the aforementioned equations, an off-the-shelf chain having an equal or greater stiffness than the calculated desired spring rate is selected to provide a stable conveyor apparatus 30 of economical construction.

EXAMPLE 1

The conveyor apparatus 30 is constructed with two chains 38, 40 and a solid take-up shaft 48. The conveyor 34 is one hundred feet long having a chain loop length of approximately two hundred feet and possessing a maximum payload of about 6,536 lbs during operation. The conveyor is intended to carry a maximum of forty pallets, each pallet being thirty inches in length, weighing approximately 27 pounds and carrying a workpiece weighing approximately 136.4 pounds. Each chain 38, 40 is a three-strand chain having a modulus of elasticity of $30*10^6$ psi and is carried by an idle sprocket 44 having a diameter of twelve inches. The coefficient of friction, $\mu$, between each chain 38, 40 and the guide rails and each chain 38, 40 and the pallets 36 is 0.1.

The conveyor is to be designed to have a natural frequency of about twenty hertz at maximum payload since this is well above the 0–12 hertz range at which conveyors are susceptible to surging and therefore will produce a conveyor of surge-resistant construction. In many instances, chain weight can be neglected because it is usually small in comparison to conveyor payload. To calculate the inertia, $I_1$, of the conveyor, the maximum conveyor payload is included in the inertia calculation so that the conveyor will possess a natural frequency of at least 20 hertz when operating at maximum payload and will possess a natural frequency greater than 20 hertz when operating at less than maximum payload:

$$I_1 = \frac{\mu n W_p r_s^2}{g} = \frac{(0.1)(4)(6{,}536 \text{ lbf})(6 \text{ in})^2}{(386 \text{ in/s}^2)}$$

$$I_1 = 243.8 \text{ lbm} \cdot \text{in} \cdot s^2$$

Since 20 hertz is the design frequency, the spring rate of the chain can be calculated:

$$W_{11} = 20 \text{ hertz} * 2\pi = 125.6 \text{ sec}^{-1}$$

therefore, from Equation III the desired chain spring rate is:

$$k_{chain} = I_1 W_{11}^2 = (263.6 \text{ lbm} \cdot \text{in} \cdot s^2)(125.6 \text{ sec}^{-1})^2$$

$$k_{chain} = 3.85 * 10^6 \text{ in} \cdot \text{lb/rad}$$

and the linear spring rate is:

$$k_1 = k_{chain}/r_s^2 = (3.85 * 10^6 \text{ in} \cdot \text{lb/rad})/(6 \text{ in})^2$$

$$k_1 = 1.07 * 10^5 \text{ lb/in}.$$

The desired cross-sectional area of both chains is calculated using equation VII:

$$A = \frac{L k_{chain}}{E} = \frac{(50 \text{ ft})(1.07 * 10^5 \text{ lb/in})(12 \text{ in/ft})}{30 * 10^6 \text{ lb/in}^2}$$

$$A = 2.14 \text{ inches}^2.$$

Note: L=50 ft., because the workpiece/pallet ratio is greater than 2 (workpiece/pallet ratio=5.05 in this example).

Since the cross-sectional area of both chains is 2.14 square inches, each chain would need to have an average cross-sectional area of at least one-half the above calculated area, or approximately 1.07 square inches. Therefore, to produce a conveyor having a natural frequency greater than 20 hertz, a designer would select, based upon the above calculations, preferably, a pair of off-the-shelf chains each having an average cross-sectional area of 1.07 inches$^2$ or greater.

To calculate average cross-sectional area for a given off-the-shelf chain, the designer need simply multiply the height of the chain link plates of the proposed chain, the thickness of each link plate and the number of link plates in the chain cross-section together (e.g., a three-strand chain has six link plates in its cross-section). Preferably an off-the-shelf chain having at least the average cross-sectional area desired is then selected.

Surge Dampener

Should a conveyor apparatus possess a natural frequency falling within the natural frequency range of about 0–12 hertz making it susceptible to surging, as is shown in FIGS. 6 & 7, in accordance with this invention an inertial dampener 116 can be attached to one or preferably both ends of the take-up shaft 48 of the conveyor apparatus 30' to prevent stick-slip from exciting the chains 38, 40 into surging and to minimize the amplitude of surging during operation of the conveyor apparatus 30'. While a dampener 116 is preferably mounted on each shaft section 62, 64 in conveyors 30' having a split take-up shaft 48, only a single dampener 116 is required to prevent stick-slip from exciting a conveyor into surging where the take-up shaft is of one-piece construction. The dampener 116 can also be mounted on conveyors as a precautionary measure to prevent the occurrence of surging, but is particularly well suited for retrofit use with conveyors that are experiencing surging during actual operation.

Figure 9:
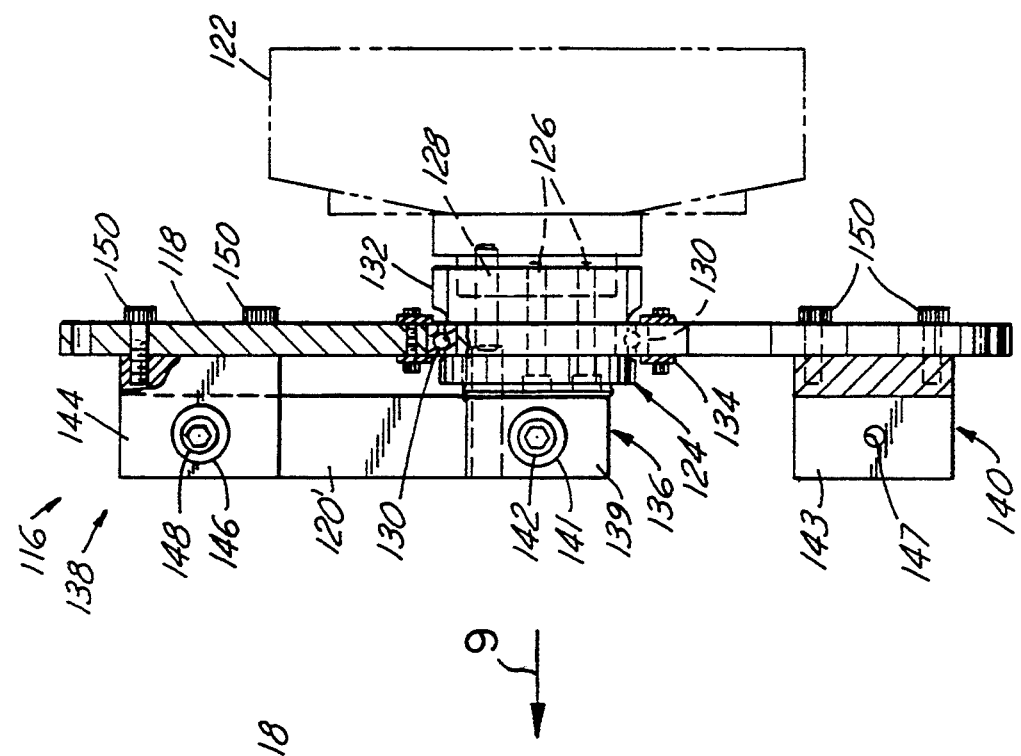
FIG. 9 is an enlarged end view, with parts broken away, of the surge dampener taken along line 9 of FIG. 8.
Figure 8:
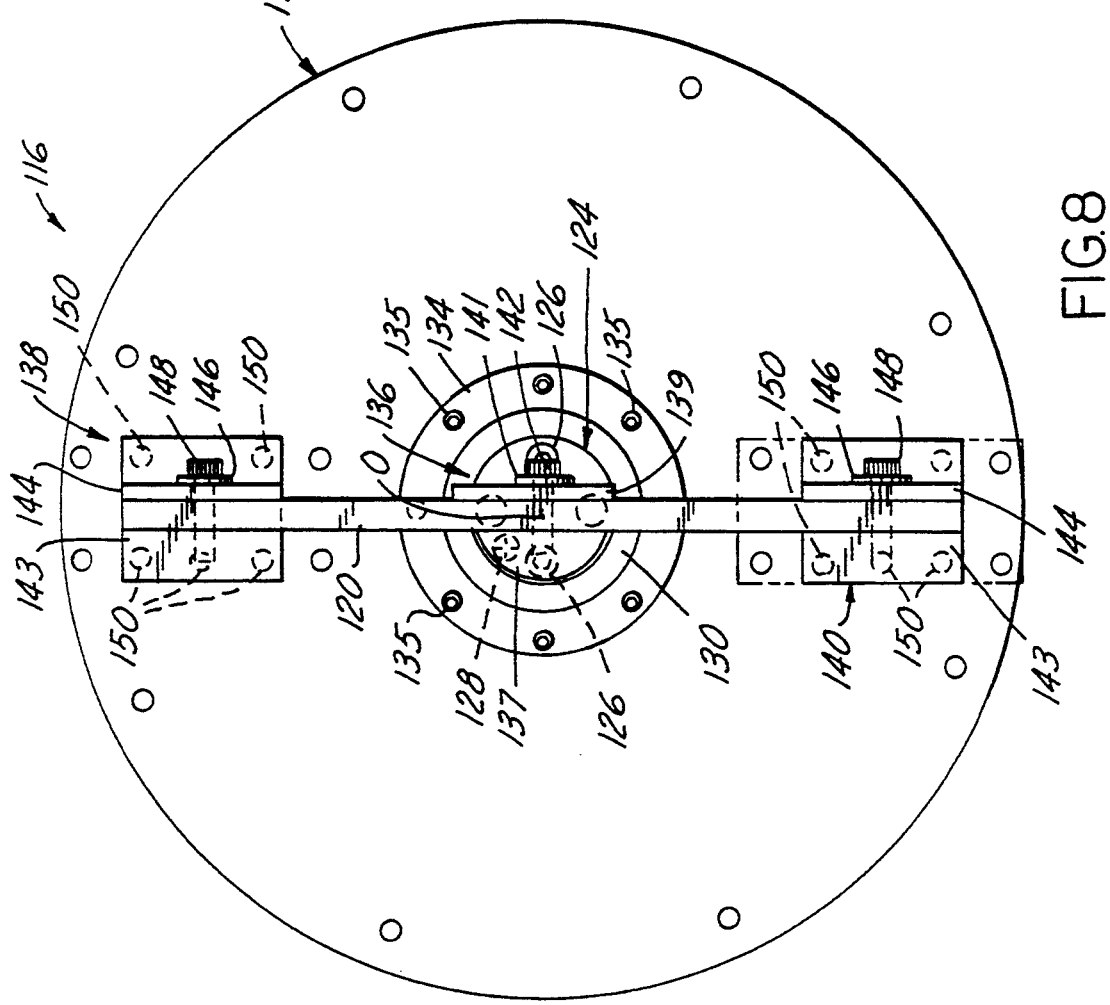
FIG. 8 is an enlarged side view of a surge dampener of the second conveyor.

As is shown more clearly in FIGS. 8 & 9, each dampener 116 consists of a preferably disc-shaped flywheel 118 coupled to the take-up shaft 48 by a spring 120 for functioning as a vibration dampener to critically dampen stick-slip and surging thereby preventing it from adversely affecting the conveyor 34 during operation. The flywheel 118 is journalled for rotation by a bearing 130 on a hub 124 which has a coupling 122 that fits over the free end of the take-up shaft 48. The hub 124 and hence the dampener 116 is secured to the shaft 48 by a dowel 128 and cap screws 126 which extend through the hub 124 and into the end of the shaft 48 securing the hub 124 to the shaft end for rotation of the hub 124 and coupling 122 in unison with the shaft 48. The inner race of the bearing 130 is releasably retained on the hub 124 by a retainer nut 132 and its outer race is secured to the flywheel 118 by retainer rings 134 and cap screws 135. However, should the diameter of the take-up shaft 48 be too small, a clamp collar (not shown), such as can be constructed by splitting the coupling 122 into two halves and clamping them around the shaft 48, can be used to secure the bearing 130 and dampener 116 to the shaft 48.

As is shown in FIGS. 8 & 9, the spring 120 is secured to the hub 124 by a mounting block 136 and to the flywheel disc 118 by second and third mounting blocks 138 & 140 attached to the disc 118 radially outwardly of its center and diametrically opposed to each other. Spring 120 preferably extends from the second mounting block 138 to the third mounting block 140 to effectively provide a pair of springs between the hub 124 and disc 118. In certain instances a relatively short spring 120' can be used, particularly where calculated spring thickness is small. If desired, either block 138 or 140 may be radially inwardly and outwardly adjustable as is shown by block 140 in phantom in FIG. 8 to accommodate springs of different lengths.

To attach the spring 120 to the hub mounting block 136, it is clamped between a clamp block 137 and a pinch spacer plate 139 by a socket head screw 142 received through the plate 139 and spring 120 which is threadably engaged in a threaded bore in the block 137. A lock washer 141 is preferably disposed between the head of the screw 142 and the plate 139 to prevent withdrawal of the screw 142 during operation. Likewise, mounting blocks 138 & 140 each clamp the spring 120 between a clamp block 143 and a pinch spacer plate 144 by a socket head screw 148 received through the plate 144 and spring 120 which is threadably engaged in a threaded bore 147 (FIG. 9) in the block 143. To prevent withdrawal of the screw 148 during operation, a lock washer 146 is preferably disposed between the head of the screw 148 and the plate 144. Mounting blocks 138 & 140 are both secured to the disc 118 by a plurality of spaced apart socket head screws 150.

Preferably, the spring 120 or 120' is a compound spring having a plurality of leaves of a material, such as steel, retained together (not shown). Preferably, the spring is constructed of a plurality of leaves of, for example, 1090 blue steel or another spring steel with each leaf being approximately sixty-thousandths to one-hundred-thousandths of an inch thick for producing a spring that is resilient, long-lasting, of economical construction and having a spring rate that can be easily varied to tune the dampener by simply adding or subtracting leaves until the desired spring rate is obtained. To form a spring 120 or 120' having the desired spring rate, $k_2$, for producing a dampener 116 possessing a natural frequency, $W_{22}$, approximately equal to the surge frequency, $W_s$, of the conveyor apparatus 30', an appropriate number of leaves are selected and retained together for mounting in blocks 136 & 138 or additionally block 140 if a long spring 120 is used. In this manner, the dampener 116 can be further tuned after installation on the conveyor apparatus 30' by removing or adding leaves to the spring as necessary to further reduce the amplitude of surging, if necessary.

Preferably, during conveyor operation each chain tensioning device 56 is isolated from the chain it is associated with to prevent the chain tensioning device 56 from possibly adding an additional degree of freedom to the conveyor and increasing surging vibration amplitude.

Theory of Operation

In general, a conveyor apparatus without a dampener 116 installed that has a low natural frequency falling generally within the natural frequency range (usually 0–12 hertz) making it susceptible to surging and experiencing stick-slip will surge at a frequency, $W_s$, which can be measured by a device, such as a watt-meter connected to the conveyor drive motor 50. Once the surge frequency, $W_s$, is known, a flywheel disc 118 having a mass that provides at least one-tenth the mass moment of inertia of the conveyor 34 is constructed for use in constructing the dampener 116. To dampen or destructively interfere with the surging to virtually eliminate it, the stiffness of the spring 120 is selected to provide a dampener 116 having a natural frequency, $W_{22}$, about equal to the surge frequency, $W_s$, of the conveyor apparatus 30' without the dampener 116 installed.

With the addition of the dampener 116, the conveyor apparatus 30' can be approximated as a system 152 having two degrees of freedom and modeled as such by two differential equations of motion. The differential equation of motion for the conveyor apparatus 30' with the dampener 116 installed is:

$$I_1\ddot{\theta}_1 + k_1\theta_1 - k_2(\theta_2-\theta_1) = F(t) \quad \text{(Equation IX)}$$

or:

$$-k_1\theta_1 + k_2(\theta_2-\theta_1) + F(t) = I_1\ddot{\theta}_1 \quad \text{(Equation X)}$$

and the equation of motion for the dampener 116 when installed on the conveyor 30' is:

$$I_2\ddot{\theta}_2 + k_2(\theta_2-\theta_1) = 0 \quad \text{(Equation XI)}$$

or:

$$-k_2(\theta_2-\theta_1) = I_2\ddot{\theta}_2 \quad \text{(Equation XII)}$$

where:

$\theta_1$ indicates the angular displacement of the idle sprocket 44;

$\theta_2$ indicates the angular displacement of the dampener flywheel 118;

$I_1$ is the equivalent mass moment of inertia of the conveyor 34 without the dampener 116 installed;

$I_2$ is the mass moment of inertia of the dampener 116, i.e. primarily the mass moment of inertia of the flywheel 118 about its axis of rotation;

$k_1$ is the spring rate of the conveyor 34;

$k_2$ is the spring rate of the dampener 116; and $F(t)$ is a forcing function representing stick-slip.

During operation, the following equations respectively describe the angular position of the idle sprocket 44 and the dampener flywheel 118 when the surging vibration is occurring:

$$\theta_1 = \Omega t + \theta_1 \sin(W_s t) \quad \text{(Equation XIII)}$$

$$\theta_2 = \Omega t + \theta_2 \sin(W_s t) \quad \text{(Equation XIV)}$$

where:

$\theta_1$ is the amplitude of the angular displacement of the idle sprocket 44;

$\theta_2$ is the amplitude of the angular displacement of the flywheel 118;

$\Omega$ is the angular velocity of the drive shaft 46; and $W_s$ is the frequency of surging.

In matrix form, the equations of motion become:

$$\begin{vmatrix} [(k_1+k_2) - I_1 w_s^2] & -k_2 \\ -k_2 & [k_2 - I_2 w_s^2] \end{vmatrix} \begin{vmatrix} \Theta_1 \\ \Theta_2 \end{vmatrix} = \begin{vmatrix} F(t) \\ 0 \end{vmatrix} \quad \begin{array}{l}\text{(Eq. XV)}\\ \text{(Eq. XVI)}\end{array}$$

Setting $F(t)=0$ for the case of free vibration, the natural frequencies of the conveyor and dampener system 152 are the eigenvalues or characteristic roots of the determinate:

$$|(W_s^2)| = (k_1+k_2-I_1 W_s^2)(k_2-I_2 W_s^2) - k_2^2 = 0 \quad \text{(Eq. XVII)}$$

and after substitution, the amplitudes $\theta_1$ and $\theta_2$ are equal to:

$$\Theta_1 = \frac{F(t)(k_2 - I_2 w_s^2)}{(k_1 + k_2 - I_1 w_s^2)(k_2 - I_2 w_s^2 - k_2^2)} \quad \text{(Eq. XVIII)}$$

$$\Theta_2 = \frac{F(t)(k_2)}{(k_1 + k_2 - I_1 w_s^2)(k_2 - I_2 w_s^2) - k_2^2} \quad \text{(Eq. XIX)}$$

Both $\theta_1$ and $\theta_2$ can be found if the magnitude of the forcing function F(t) is known.

The equations can be further simplified by the following relations:

$$w_{11}^2 = \frac{k_1}{I_1} \quad \text{(Equation XX)}$$

and $$w_{22}^2 = \frac{k_2}{I_2} \quad \text{(Equation XXI)}$$

where:

$W_{11}$ is the natural frequency of the conveyor apparatus 30' alone without the dampener 116 installed; and $W_{22}$ is the natural frequency of the dampener 116 alone without being installed on the conveyor apparatus 30'.

The ratio of the mass moment of inertia, $I_2$, of the dampener 116 to the mass moment of inertia, $I_1$, of the conveyor 34 is defined as:

$$\kappa = \frac{I_2}{I_1} \quad \text{(Equation XXII)}$$

The stiffness ratio of the system 152 can be written as:

$$\frac{k_2}{k_1} = \frac{\kappa w_{22}^2}{w_{11}^2} = \beta^2 \kappa \quad \text{(Equation XXIII)}$$

where:

$$\beta + W_{22}/W_{11}. \quad \text{(Equation XXIV)}$$

After substitution, the amplitudes of the angular displacements $\theta_1$ and $\theta_2$ can be solved by:

$$\Theta_1 = \frac{F(t)}{k_1} \frac{1 - w_s^2/w_{22}^2}{(1 + \kappa w_{22}^2/w_{11}^2 - w_s^2/w_{11}^2)(1 - w_s^2/w_{22}^2) - \kappa w_{22}^2/w_{11}^2} \quad \text{(Equation XXV)}$$

$$\Theta_2 = \frac{F(t)}{k_1} \frac{1}{(1 + \kappa w_{22}^2/w_{11}^2 - w_s^2/w_{11}^2)(1 - w_s^2/w_{22}^2) - \kappa w_{22}^2/w_{11}^2} \quad \text{(Equation XXVI)}$$

As can be seen in equation XXV above, when the natural frequency, $W_{22}$, of the dampener 116 is tuned to the surge frequency, $W_s$, of the conveyor apparatus 30', the amplitude of chain surge, $\theta_1$, becomes virtually non-existent and thus the chains 38, 40 move smoothly around the idle sprockets 44 at a virtually constant angular velocity $\Omega$. Although in theory, as is shown in equation XXV, the dampener 116 should eliminate the surging completely, in reality, the effect of inherent damping in the system 152 will allow a negligible amount of residual vibration to remain, as is shown in FIG. 16, even when the conveyor 34 is run exactly at the surge excitation speed, i.e. a slow speed within the range of conveyor speeds that would normally have resulted in stick-slip exciting the conveyor 34 into surging.

Figure 10:
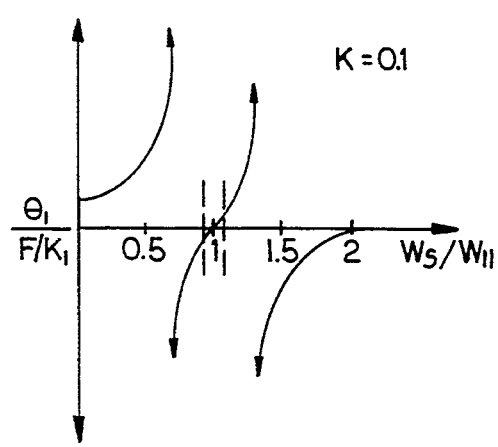
FIG. 10 is a graph of conveyor surging amplitude versus the ratio of surging frequency over the natural frequency of the conveyor apparatus illustrating how optimum tuning of the surge dampener minimizes surging of the conveyor for a surge dampener having a mass moment of inertia ratio of 0.1.
Figure 12:
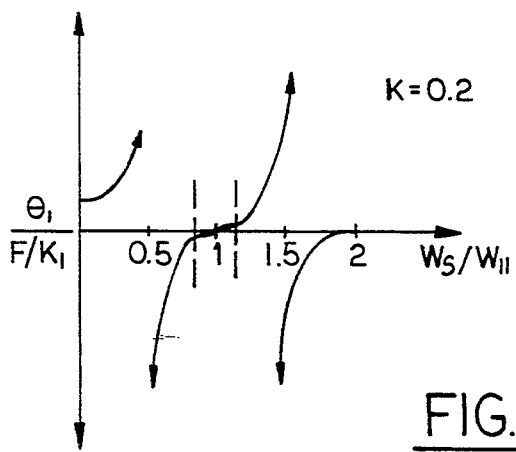
FIG. 12 is a graph of surging amplitude versus the ratio of surging frequency over the natural frequency of the conveyor apparatus for a surge dampener having an inertia ratio of 0.2.

This vibration dampening effect of the dampener 116, as shown in equation XXV, is also graphically represented in FIG. 10, which illustrates a graph of surge amplitude, $\theta_1$, versus the ratio of surging frequency over the conveyor natural frequency, $W_s/W_{11}$, for a surge dampener 116 having a mass moment of inertia ratio, k, of 0.1 and tuned to the surge frequency, $W_s$, of a conveyor apparatus 30' having a surge frequency, $W_s$, that is the same as its natural frequency, $W_{11}$. As is shown in FIG. 10, assuming that friction between each chain 38, 40 and the conveyor guide rails is constant, the surge amplitude, $\theta_1$, of the conveyor 34 is theoretically zero at ($W_s/W_{11}=1$) when the natural frequency, $W_{22}$, of the dampener 116 is tuned to the surge frequency, $W_s$. Furthermore, from FIG. 10 it can be seen that if $W_s/W_{11}$ should vary slightly from unity thereby slightly changing the tuning of the dampener 116, the dampener 116 will still provide an acceptable level of vibration dampening and hence significantly reduce surging of the conveyor 34 to a negligible amplitude. Therefore, for a conveyor apparatus 30' encountering changing operating conditions shifting its natural frequency, $W_{11}$, or even shifting slightly the surge frequency, $W_s$, the dampener 116 provides a bandwidth of surge suppression extending on either side of the point on the graph where $W_s/W_{11}=1$, illustrated by the region between the dashed lines on either side of that point, where the conveyor amplitude, $\theta_1$, is about zero or at a level which will not adversely affect operation of the conveyor apparatus 30'. As is further shown in FIG. 12 of a graph of a dampener 116 having an inertia ratio, k, of 0.2 and installed on a conveyor apparatus 30' having the same natural and surge frequency operating characteristics as the conveyor apparatus of FIG. 10, this bandwidth of surge suppression increases with increasing dampener moment of inertia, $I_2$, when the dampener 116 is properly tuned.

Figure 11:
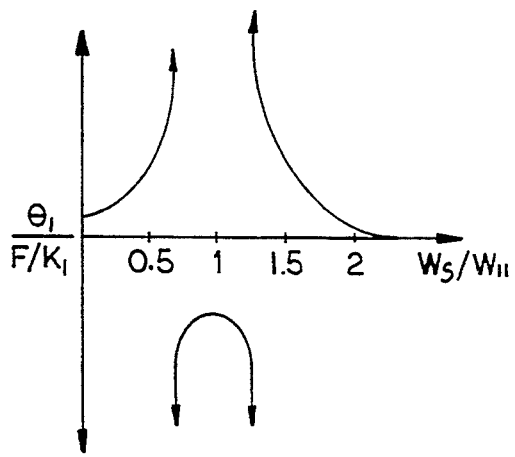
FIG. 11 is a graph detailing angular displacement of the surge dampener during operation of the conveyor.

When installed on the take-up shaft 48 of the conveyor apparatus 30', the displacement, $\theta_2$, of the dampener 116 is described in equation XXVI and graphically depicted in FIG. 11. It can be seen from FIG. 11 that the dampener 116 is in motion and continually counteracting stick-slip and conveyor surging when its natural frequency, $W_{22}$, is adequately tuned to the surge frequency, $W_s$, of the conveyor apparatus 30'.

The theory of operation of the surge dampener 116 may be further understood by summing the moments about the center, , of the dampener 116 to obtain a differential equation of motion describing the response of the dampener 116 during operation of the conveyor 30':

$$\Sigma M_o = \Sigma(M_k)_o \quad \text{(Equation XXVII)}$$

$$-F_s(r') = I_2 \ddot{\theta}_2 = [\tfrac{1}{2} m_f R^2] \ddot{\theta}_2 \quad \text{(Equation XXVIII)}$$

where:

$F_s$ is the force exerted on the spring 120 during operation of the conveyor;

$m_f$ is the mass of the flywheel disc 118;

R is the outer radius of the disc 118; and r' is the effective length of the spring 120.

The mass, $m_f$, of the flywheel disc 118 can be calculated using the following equation:

$$m_f = \pi(R^2 - r_i^2)t\rho \quad \text{(Equation XXIX)}$$

where:
- $\pi$ is pi, a constant denoting the ratio of the circumference of a circle to its diameter which can be approximated as 3.1459; and
- $r_i$ is the inner radius of the flywheel disc 118 created by the opening in the disc 118 for receiving the bearing 130;
- $t$ is the thickness of the disc 118; and
- $\rho$ is the density of the flywheel disc material.

Additionally, knowing the force, $F_s$, that the spring 120 experiences is zero at $\theta_2=0$ and $F_s=k_2 r'\theta_2$ for small values of $\theta_2$, the following substitutions to equation XXVIII can be made:

$$k_2 r'\theta_2(r') = \tfrac{1}{2}R^2\pi(R^2 - r_i^2)t\rho\ddot{\theta}_2 \quad \text{(Equation XXX)}$$

Arranging equation XXX in characteristic equation form, its solution is in the form:

$$p^2 = \frac{k_2(r')^2}{\tfrac{1}{2}R^2\pi(R^2 - r_i^2)t\rho} \quad \text{(Equation XXXI)}$$

From this, the time constant, $\tau$, of the surge dampener 116 can be determined:

$$\tau = \frac{2\pi}{\sqrt{\dfrac{k_2(r')^2}{\tfrac{1}{2}R^2\pi(R^2 - r_i^2)t\rho}}} \quad \text{(Equation XXXII)}$$

Knowing that for a cantilevered spring, $k = \text{force} \div \text{deflection}$ for a given spring rate:

$$k_2 = \frac{F_s}{\delta} = \frac{F_s}{\dfrac{F_s(r')^2(2r')}{6E_s I_s}} = \frac{3E_s I_s}{(r')^3} \quad \text{(Eq. XXXIII)}$$

where:
- $\delta$ is the deflection of the spring 120;
- $I_s$ is the area moment of inertia of the spring 120; and
- $E_s$ is the Young's modulus of the spring 120.

After substitution, equation XXXII becomes:

$$\tau = \frac{2\pi}{\sqrt{\dfrac{\dfrac{3E_s I_s(r')^2}{L^3}}{\tfrac{1}{2}R^2\pi(R^2 - r_i^2)t\rho}}} \quad \text{(Equation XXXIV)}$$

The natural frequency, $f_{22}$, of the dampener 116 in hertz is the reciprocal of its time constant, $\tau$:

$$f_{22} = \frac{\sqrt{\dfrac{\dfrac{3E_s I_s}{r'}}{\tfrac{1}{2}R^2\pi(R^2 - r_i^2)t\rho}}}{2\pi} \quad \text{(Equation XXXV)}$$

Therefore, upon tuning the dampener 116 by setting its natural frequency, $W_{22}$, equal to the surge frequency, $W_s$, of the conveyor apparatus 30', the mass of the flywheel 118 and physical dimensions of the flywheel 118 and spring 120 can be determined.

Figure 13:
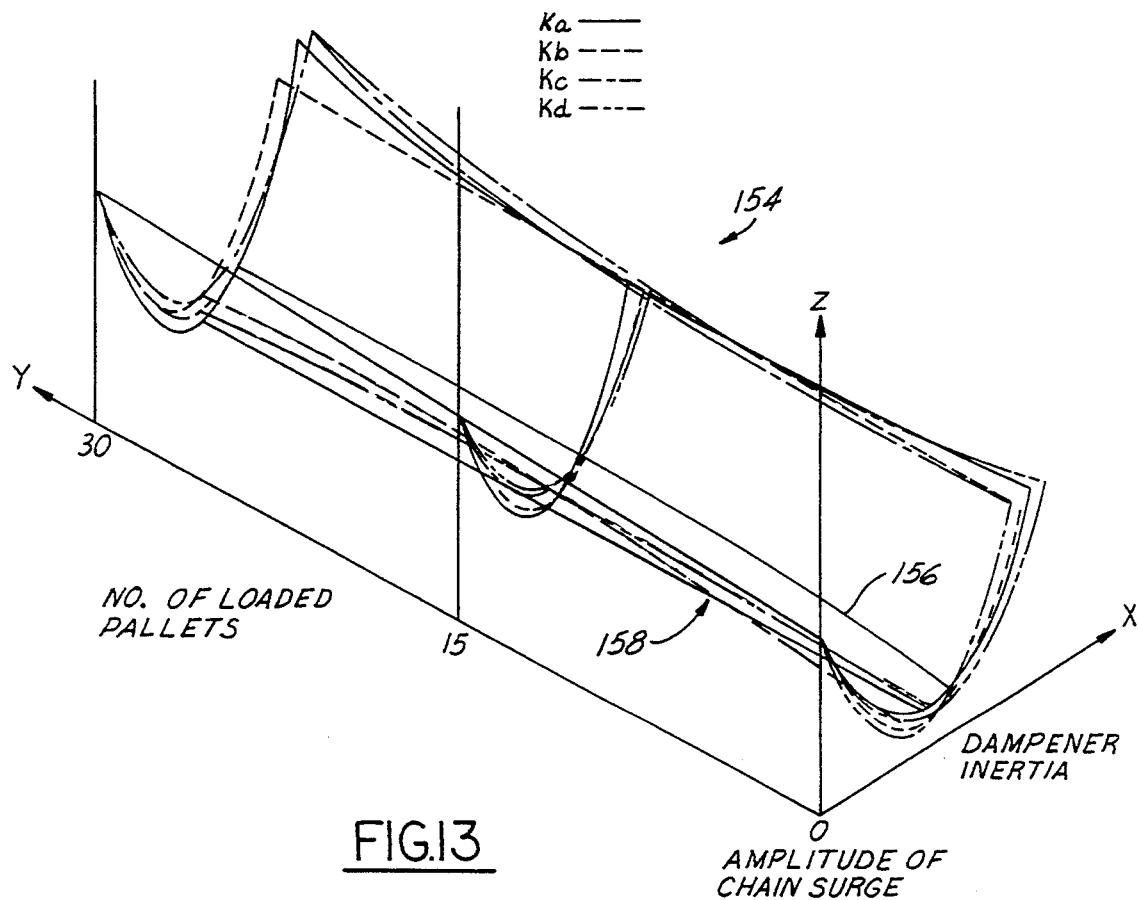
FIG. 13 is a three-dimensional graph detailing the surge dampening characteristics of the surge dampener under a wide variety of conveyor pallet payloads using springs possessing varying spring rates.

FIG. 13 illustrates a trough-shaped, three-dimensional plot of a series of curves 154 showing the performance of dampeners 116 installed on a conveyor apparatus 30' transporting varying payloads of pallets 36 and having a wide range of flywheel mass moments of inertia coupled to springs 120 each having slightly different spring rates, $k_a$ through $k_d$. Each curve is parabola-shaped in the X-Z axis, illustrating that there is an optimum flywheel mass moment of inertia that will minimize surging amplitude for each of the spring rates, $k_a$-$k_d$. When these are determined for a conveyor apparatus 30' transporting increasing payloads of pallets 36 and combined along the Y-Z axis, they form plot 154 illustrating that there is an optimum combination of flywheel mass moment of inertia and spring rate ($k_a$) that will provide the best surging vibration dampening across the wide variety of payloads that the conveyor 34 is likely to encounter during actual operation. If using such a series of curves 154 to design a dampener 116, a spring 120 having a spring rate ($k_a$) that provides the best surge suppression over the widest range of loading conditions encountered by the conveyor apparatus 30' is preferably selected for use in the dampener 116.

As is shown by solid line 156, should a dampener 116 having a spring 120 with spring rate, $k_a$, possess a flywheel moment of inertia greater than about the optimum, it will allow a greater amount of surge amplitude to remain. Likewise, a dampener having a flywheel mass moment of inertia less than about the optimum will allow some surging to remain. Therefore, should the dampener 116 possess a mass moment of inertia less or greater than optimum, the dampener will allow some surging to remain. Should the variance from optimum mass moment of inertia be minimal, the resulting amplitude of surging will not adversely interfere with operation of the conveyor 34 giving the dampener a bandwidth of surge suppression on either side of where inertia is optimum.

The bottom of the trough of each curve 154 extending on either side of the lines of minimum surge amplitude 158 further illustrates the bandwidth of surge suppression of the dampener 116 where the amplitude of surging vibration is at a minimum when the dampener 116 is tuned precisely to the surge frequency, $W_s$, or near a minimum if tuned near the surge frequency, $W_s$, and will not affect adversely the operation of the conveyor 34. This bandwidth of surge suppression also applies should the surge frequency, $W_s$, or conveyor natural frequency, $W_{11}$, change slightly during conveyor operation, allowing a dampener 116 to suitably reduce surge amplitude, $\theta_1$, when the conveyor 34 is encountering varying loading or other operating conditions.

The width of the trough where the amplitude of surging, $\theta_1$, is acceptably low corresponds roughly to the latus rectum of the curves 154 in FIG. 13 and is the bandwidth of surge suppression. The bandwidth is dependent upon tuning of the spring 120 and the mass of the flywheel 118. As was also illustrated in FIG. 10, the bandwidth of surge suppression is increased as the mass moment of inertia of the dampener 116 is increased, so long as the spring rate of the spring 120 is chosen to properly tune the dampener 116 to or suitably near the surge frequency, $W_s$, of the conveyor 34.

Figure 14:
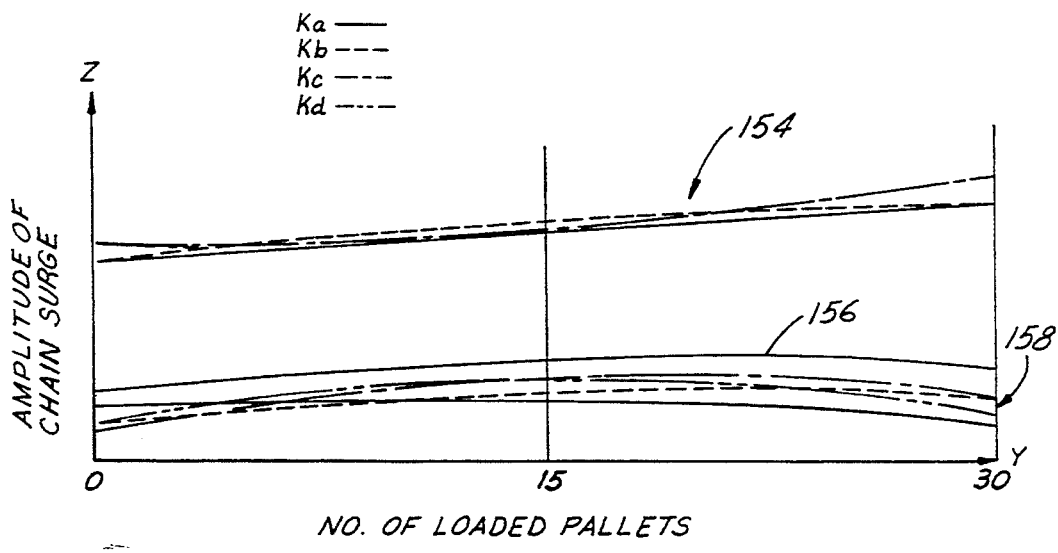
FIG. 14 is a two-dimensional graph taken of the Y-Z axis of the graph of FIG. 13 illustrating more clearly how different spring rates of the dampener reduce surging of the conveyor.

Lines depicting minimum and maximum surge amplitude for each spring 120 (shown at the bottom and top of each side of the trough of the plot 154 in FIG. 13) are more clearly illustrated in FIG. 14. The solid line ($k_a$) and dotted lines ($k_b$ through $k_d$) which extend along the bottom of each curve depict the points for all loading conditions for which each spring 120 is minimizing surge amplitude. As is also shown in FIG. 14, the spring 120 having the most optimum spring rate, $k_a$, providing the best surge suppression over the widest range of loading conditions encountered by the conveyor apparatus 30' is preferably selected for use in the dampener 116.

When determining the mass moment of inertia, $I_2$, of the dampener 116, the mass moment of inertia, $I_1$, of the conveyor 34, without the dampener 116 installed, is determined using equation VI and multiplied by a predetermined value of inertia ratio k. After substitution:

$$I_2 = k[\mu n W_p r_s^2] = k I_1 \quad \text{(Equation XXXVI)}$$

Referring once again to FIG. 13, for increasing inertia ratios beyond $k=0.1$, the parabolic cross-section of each curve will have a greater latus rectum or flatter trough and therefore the dampener 116 when properly tuned will possess a wider bandwidth of surge suppression where the amplitude of surging is low and will not adversely affect conveyor operation. Therefore, for higher values of k, typically in the range of about 0.2 to about 0.5, the dampener 116 can be tuned less precisely to the surge frequency, $W_s$, and still provide effective reduction of the surging amplitude. However, it is generally impractical to use a relatively large value for k, for example $k>0.8$, because this would require the construction of an unreasonably large and massive flywheel 118 that could interfere with operation of the conveyor apparatus 30' when installed or be incapable of working with springs 120 having the desired spring rate to properly tune the dampener 116 to the surge frequency, $W_s$. Therefore, a value of k in the range of about 0.1 to about 0.5 is preferably used.

With the addition of the dampener 116, an additional degree of freedom is added to the conveyor apparatus 30' which also changes the resonant frequency characteristics of the conveyor and dampener system 152. Instead of only one natural frequency, $W_{11}$, the system 152 now has two natural frequencies, $W'_{n1}$ and $W'_{n2}$. The natural frequencies of the conveyor and dampener system 152 can be found using the following equation derived from equation XVII above:

$$\beta^2(W'_n{}^4/W_{22}{}^4) - (W'_n{}^2/W_{22}{}^2)[1+\beta^2(1+k)] + 1 = 0 \quad \text{(Eq. XXXVII)}$$

where:

$W'_n$ represents the new natural frequencies of the conveyor and dampener system 152.

This equation may be rewritten in operator form:

$$P^4(\beta^2/W_{22}{}^4) - P^2/W_{22}{}^2[1+\beta^2(1+k)] + 1 = 0 \quad \text{(Eq. XXXVIII)}$$

and has four roots:

$$P_1, P_2 = \pm j W'_{n1}$$

$$P_3, P_4 = \pm j W'_{n2}$$

The above fourth order differential equation can be placed in quadratic form and solved as:

$$\frac{P^2}{W_{22}^2} = \frac{[1+\beta^2(1+\kappa)] \pm \sqrt{[1+\beta^2(1+\kappa)]^2 - 4\beta^2}}{2\beta^2} \quad \text{(Equation XXXIX)}$$

therefore, $$\frac{W'_{n1}}{W_{22}} = \left| \frac{[1+\beta^2(1+\kappa)] + \sqrt{[1+\beta^2(1+\kappa)]^2 - 4\beta^2}}{2\beta^2} \right|^{\frac{1}{2}} \quad \text{(Equation XL)}$$

and, $$\frac{W'_{n2}}{W_{22}} = \left| \frac{[1+\beta^2(1+\kappa)] - \sqrt{[1+\beta^2(1+\kappa)]^2 - 4\beta^2}}{2\beta^2} \right|^{\frac{1}{2}} \quad \text{(Equation XLI)}$$

Alternatively, equation XXXVIII may be solved using modern numerical methods, such as an equation solving computer program, or the like, to determine the new natural frequencies, $W'_{n1}$ & $W'_{n2}$ of the conveyor and dampener system 152.

For some conveyors or under certain conveyor operating conditions, $W_s = W_{11} = W_{22}$, and therefore $\beta = 1$ simplifying the equations above. More typically, however, $W_s \neq W_{11}$, especially when the conveyor is undergoing changing loading conditions during operation frequently causing the natural frequency, $W_{11}$, of the conveyor to vary.

After installation of the dampener 116, the two new natural frequencies of the conveyor system 152, $W'_{n1}$, $W'_{n2}$, must be determined to operate the conveyor 34 at a speed that does not cause vibration at either natural frequency. However, should vibration occur, the spring rate, $k_2$, of the dampener 116 can be varied by choosing a different spring, or adding or subtracting spring leaves to "tune" the system 152 to a slightly different set of natural frequencies and eliminate the vibration. However, any tuning of this nature must be carefully done to avoid tuning the dampener 116 to a frequency so far away from the surge frequency, $W_s$, that surging begins to affect operation of the conveyor apparatus 30'.

Principles of Design

Prior to installing a dampener 116 on a conveyor experiencing surging, its surge frequency, $W_s$, is determined preferably by connecting a watt-meter to the drive motor 50 of the conveyor to measure the frequency of power variation in the motor 50 caused by fluctuating torque applied to the motor 50 by the chains 38, 40 during surging. As is represented in a plot shown in FIG. 15 of drive motor power consumption over time, t, in a conveyor experiencing surging, the frequency of the power fluctuations of the drive motor 50 corresponds to the frequency of surging, $W_s$. Since the surge frequency, $W_s$, remains generally the same for all conveyor speeds after surging has begun, although it may decrease slightly as conveyor speed is decreased, the speed of the conveyor need simply be reduced until surging occurs to determine $W_s$.

Once the conveyor surge frequency, $W_s$, has been determined, the inertia, $I_1$, of the conveyor 34 is calculated using equation V above. Knowing the characteristics of the chain 40, $k_1$ is calculated using equations VII & VIII above and the natural frequency of the conveyor, $W_{11}$, is calculated using equation III above.

To determine the mass moment of inertia, $I_2$, of the flywheel disc 118, the mass moment of inertia, $I_1$, of the conveyor 34 is multiplied by the inertia ratio, k. Preferably, k is selected to be at least 0.1 and more preferably about 0.2 to produce a dampener 116 that, when properly tuned, has a flywheel 118 possessing a large enough mass moment of inertia to provide a sufficiently wide bandwidth of surge suppression for preventing surging under the wide variety of conveyor loading and operating conditions typically encountered by the conveyor 34. Although k can be as high as 1 when determining the mass moment of inertia, $I_2$, of the flywheel 118, it is generally impractical to use such a high inertia ratio because it typically would result in the use of a massive flywheel of unmanageable size.

The mass, $m_f$, of the flywheel disc 118 can be calculated once the mass moment of inertia, $I_2$, of the disc 118 has been determined knowing the following relationships:

$$m_f = \frac{\pi(R^2 - r_i^2)t\rho}{g} \approx \frac{2I_2}{R^2} \tag{Eq. XLII}$$

where:
- $m_f$ is the mass of the flywheel disc 118;
- R is the outer radius of the disc 118; and
- $r_i$ is the inner radius of the flywheel disc 118 created by the opening in the disc 118 for receiving the bearing 130;
- t is the thickness of the disc 118; and
- $\rho$ is the density of the flywheel disc material.

knowing that $I_2 = kI_1$ and $I_2 = \frac{1}{2}m_f(R^2 - r_i^2)$ for a disc with a circular opening, such as flywheel disc 118 having an opening of radius $r_i$ for receiving bearing 130 therein. Therefore, knowing the inner radius, $r_i$, of the disc 118 to be used for receiving the bearing 130 and choosing a preferred outer radius, R, of the disc 118, the thickness, $t_{disc}$, of the disc 118 can be determined:

$$t_{disc} = \frac{m_f g}{\pi(R^2 - r_i^2)\rho} \approx \frac{m_f g}{\pi R^2 \rho} \tag{Eq. XLIII}$$

Of course, to vary the thickness, $t_{disc}$, of the disc 118 for producing a disc 118 having the same mass, $m_f$, as calculated above, its outer radius, R, can be suitably varied.

After the mass moment of inertia, $I_2$, and physical dimensions of the flywheel disc 118 have been determined, the spring rate, $k_2$, of the spring 120 is calculated using equation XIX and $k_2$ is solved for by setting $W_{22} = W_s$ to tune the dampener 116 to the surge frequency, $W_s$, for maximum surge suppression:

$$k_2 = W_{22}^2 I_2 = W_s^2 I_2 \tag{Eq. XLIV}$$

Since the position of mounting block 138 relative to the center, , of the flywheel disc 118 is known, the length, r', of the spring 120 is known and the width of the spring, b, is also known because the opening in each mounting block for receiving the spring is generally fixed. Knowing the modulus of elasticity, $E_s$, of the proposed spring material, the thickness of the spring 120 can be calculated:

$$t_{spring} = \sqrt[3]{\frac{4k_{2linear}(r')^3}{bE_s}} \tag{Eq. XLV}$$

where:

$k_{2linear}$ is the spring rate of spring 120 in linear units.

After determining these specifications, $\beta$ is determined using equation XXIV and the two new natural frequencies of the conveyor system, $W'_{n1}$, $W'_{n2}$, are determined to ensure that the conveyor apparatus 30' is not operated at a speed that results in vibration at either new natural frequency.

Alternatively, should it be desired to add a dampener 116 to a conveyor apparatus 30' as a precautionary measure to prevent surging in the future from occurring, the natural frequency of the dampener can be set equal to a frequency in the middle of a range of known frequencies at which conveyors are typically known to surge, for example from approximately 6 to about 14 hertz, and a relatively high inertia ratio selected, for example k=0.5, to produce a flywheel 118 that has a large enough moment of inertia to counteract surging at no matter what frequency it may manifest itself. However, a somewhat lower inertia ratio, k, may be selected if a less massive flywheel 118 is desired.

EXAMPLE 2

The conveyor apparatus 30' is constructed with two chains 38, 40 and a split take-up shaft 48 having an idle sprocket 44 on each shaft section 62, 64. The conveyor 34 is one hundred forty feet long having a chain loop length of approximately two hundred eighty feet and possessing a maximum payload capacity of 18,000 lbs. Each chain 38, 40 is a three-strand chain having an average cross-sectional area of 0.458 in.$^2$ and a modulus of elasticity of $30*10^6$ psi. Each chain 38, 40 is carried by an idle sprocket 44 having a diameter of twelve inches. The coefficient of friction, $\mu$, between each chain 38, 40 and the guide rails and each chain 38, 40 and the pallets 36 is 0.1 and the inertia ratio, k, is specified to be 0.25. The flywheel disc 118 of the dampener 116 is to have a diameter of thirty inches. The spring 120 is to have a length of twenty-eight inches, a width of two inches and an effective length, r', of seven inches. The workpiece/pallet ratio is greater than 2, so L=one-half the conveyor length, or 70 feet, when determining the spring rate of one chain. The conveyor 34 is surging at 10.7 hertz (67.2 rad/sec).

To calculate the inertia, $I_1$, of the conveyor having a split take-up shaft 48, only one-half of the maximum conveyor payload, or 9,000 lbs, is included in the inertia calculation:

$$I_1 = \mu n W_p r_s^2 g = (0.1)(4)(9,000 \text{ lbf})(6 \text{ in})^2/386 \text{ in/s}^2\text{-lbm}$$

$$I_1 = 335.8 \text{ lbm-in-}s^2$$

To calculate the spring rate of the chain, since the conveyor has a split take-up shaft, the average cross sectional area of only one chain is used:

$$k_{chain} = \frac{AE}{L} = \frac{(0.46 \text{ in.}^2)(30 * 10^6 \text{ psi.})}{(70 \text{ ft.})(12 \text{ in./ft.})} = 1.6 * 10^4 \frac{\text{lbf}}{\text{in.}}$$

and $k_{chain}$ is converted to its angular equivalent:

$$k_1 = \frac{k_{chain} r_s}{\frac{s}{r_s}} = 5.9 * 10^5 \frac{\text{in lbf}}{\text{rad}}$$

To calculate the natural frequency of the conveyor:

$$w_{11} = \sqrt{\frac{k_1}{I_1}} = 41.9 \frac{\text{rad}}{\text{sec}} = 6.67 \text{ hertz}$$

To calculate the inertia of the dampener:

$$I_2 = kI_1 = (0.25)(335.8 \text{ lbm·in·}s^2) = 83.9 \text{ lbm·in·}s^2$$

The mass of the flywheel disc is:

$$m_f \approx \frac{2\kappa I_1}{R^2} = \frac{2*(83.9 \text{ lbm·in·}s^2)}{(15 \text{ in})^2} = 0.75 \text{ lbm}$$

The weight of the disc is:

$$W_d = (0.75 \text{ lbm})(386 \text{ lbf·in}/s^2\text{·lbm}) = 287.8 \text{ lbf}$$

The thickness of the disc is:

$$t_{disc} = \frac{m_f g}{\pi R^2 \rho} = \frac{287.8 \text{ lbf}}{\pi(15 \text{ in})^2(0.283 \text{ lb/in}^3)}$$

$$t_{disc} = 1.43 \text{ inches} \sim 1\tfrac{1}{2} \text{ inch}$$

To determine the spring rate, $k_2$, of the spring:

$$k_2 = W_{22}^2 I_2 = W_s^2 I_2 = (67.2 \text{ rad/sec})^2(83.9 \text{ lbm·in·}s^2)$$

$$k_2 = 3.8 * 10^5 \text{ in·lbf/rad}$$

Since the effective length, r', of the spring 120 is given as seven inches, the linear spring rate, $k_{2linear}$, can be calculated:

$$k_{2linear} = k_2/r'^2 = \frac{(3.8 * 10^5 \text{ in·lbf/rad})}{(7 \text{ in})^2}$$

$$k_{2linear} = 7.7 * 10^3 \text{ lbf/in}$$

The thickness, $t_{spring}$, of the spring 120 can be determined using equation XLV:

$$t_{spring} = \sqrt[3]{\frac{4k_{2linear}(r')^3}{bE_s}}$$

$$t_{spring} = \sqrt[3]{\frac{4(7.7 * 10^3 \text{ lbf/in})(7 \text{ in})^3}{(2 \text{ in})(30 * 10^6 \text{ psi.})}}$$

$$t_{spring} = 0.56 \text{ inches (if using shorter spring 120')}$$

Should a longer spring 120 be used, the thickness of the spring, $t_{spring}$, would be one-half the above calculated value or:

$$t_{spring} = 0.28 \text{ inches}$$

The two new natural frequencies of the conveyor and dampener system 152 can be found solving equation XXXVIII above. The two new natural frequencies of the system are W'$_{n1}$=5.74 hertz and W'$_{n2}$=12.44 hertz.

Therefore, a pair of dampeners 116, each having a flywheel 118 of about 1½ inches thick and thirty inches in diameter with a weight of about 287.8 lbs and a long spring 120 slightly greater than one-half inch thick with a spring rate of $3.8*10^5$ in·lbf/rad, are attached to the split take-up shaft 48, with a dampener 116 attached to one end of each shaft section of the split take-up shaft 48 of the conveyor of this example for preventing stick-slip and surging vibration from adversely affecting operation of the conveyor.

EXAMPLE 3

The conveyor apparatus 30' is constructed with two chains 38, 40 and a solid take-up shaft 48. The conveyor 34 is one hundred ten feet long having a chain loop length of approximately two hundred twenty feet and possessing a maximum payload capacity of 12,000 lbs. Each chain 38, 40 is a 4-strand chain having an average cross-sectional area of 0.61 in.$^2$ and a modulus of elasticity of $30*10^6$ psi. Each chain 38, 40 is carried by an idle sprocket 44 having a diameter of twelve inches. The coefficient of friction, $\mu$, between each chain 38, 40 and the guide rails and each chain 38, 40 and the pallets 36 is 0.1 and the inertia ratio, k, is specified to be 0.2. The flywheel disc 118 of the dampener 116 is to have a diameter of thirty inches. The spring 120 is to have a length of twenty-eight inches, and width of two inches and an effective length, r', of eight inches. The workpiece/pallet ratio is greater than 2, so L=one-half the conveyor length, or 55 feet, when determining the spring rate of the chains. The conveyor 34 is surging at 8.5 hertz (53.4 rad/sec).

To calculate the inertia, $I_1$, of the conveyor having a solid take-up shaft 48, the entire conveyor payload of 12,000 lbs is included in the inertia calculation:

$$I_1 = \mu n W_p r_s^2/g = (0.1)(4)(12,000 \text{ lbf})(6 \text{ in})^2/386 \text{ in}/s^2\text{·lbm}$$

$$I_1 = 447.67 \text{ lbm·in·}s^2$$

To calculate the spring rate of the chain, since the conveyor has a solid take-up shaft, the average cross sectional area of both chains is used:

$$k_{chain} = \frac{AE}{L} = \frac{(1.22 \text{ in.}^2)(30 * 10^6 \text{ psi.})}{(55 \text{ ft.})(12 \text{ in./ft.})} = 5.5 * 10^4 \frac{\text{lbf}}{\text{in.}}$$

and $k_{chain}$ is converted to its angular equivalent:

$$k_1 = \frac{k_{chain} r_s}{\frac{s}{r_s}} = 2.0 * 10^6 \frac{\text{in lbf}}{\text{rad}}$$

To calculate the natural frequency of the conveyor:

$$w_{11} = \sqrt{\frac{k_1}{I_1}} = 66.8 \frac{\text{rad}}{\text{sec}} = 10.6 \text{ hertz}$$

To calculate the inertia of the dampener:

$$I_2 = kI_1 = (0.2)(447.7 \text{ lbm·in·}s^2) = 89.5 \text{ lbm·in·}s^2$$

The mass of the flywheel disc is:

$$m_f \approx \frac{2\kappa I_1}{R^2} = \frac{2*(89.5 \text{ lbm} \cdot \text{in} \cdot s^2)}{(15 \text{ in})^2} = 0.796 \text{ lbm}$$

The weight of the disc is:

$$W_d = (0.796 \text{ lbm})(386 \text{ lbf} \cdot \text{in}/s^2 \cdot \text{lbm}) = 307.2 \text{ lbf}$$

The thickness of the disc is:

$$t_{disc} = \frac{m_f g}{\pi R^2 \rho} = \frac{307.2 \text{ lbf}}{\pi (15 \text{ in})^2 (0.283 \text{ lb/in}^3)}$$

$$t_{disc} = 1.535 \text{ inches} \approx 1\tfrac{1}{2} \text{ inches}$$

To determine the spring rate, $k_2$, of the spring:

$$k_2 = W_{22}{}^2 I_2 = W_s{}^2 I_2 = (53.4 \text{ rad/sec})^2 (89.5 \text{ lbm} \cdot \text{in} \cdot s^2)$$

$$k_2 = 2.55*10^5 \text{ in} \cdot \text{lbf/rad}$$

Since the effective length, $r'$, of the spring 120 is eight inches, the linear spring rate, $k_{2linear}$, can be calculated:

$$k_{2linear} = k_2/r'^2 = \frac{(2.6 * 10^5 \text{ in} \cdot \text{lbf/rad})}{(8 \text{ in})^2}$$

$$k_{2linear} = 3.98 * 10^3 \text{ lbf/in}$$

The thickness, $t_{spring}$, of the spring 120 can be determined using equation XLV:

$$t_{spring} = \sqrt[3]{\frac{4 k_{2linear}(r')^3}{bE_s}}$$

$$t_{spring} = \sqrt[3]{\frac{4(3.98 * 10^3 \text{ lbf/in})(8 \text{ in})^3}{(2 \text{ in})(30 * 10^6 \text{ psi})}}$$

$t_{spring} = 0.514$ inches (if using shorter spring 120')

Should a longer spring 120 be used, the thickness of the spring, $t_{spring}$, would be one-half the above calculated value or:

$t_{spring} = 0.26$ inches

The two new natural frequencies of the conveyor and dampener system 152 can be found solving equation XXXVIII above. The two new natural frequencies of the system are $W'_{n1} = 9.54$ hertz and $W'_{n2} = 15.0$ hertz.

Therefore, a single dampener 116 having a flywheel 118 of about 1½ inches thick and thirty inches in diameter with a weight of about 307.2 lbs, and a spring 120 slightly greater than one-half inch thick with a spring rate of $2.55*10^5$ in·lbf/rad is attached to one end of the solid take-up shaft 48 of the conveyor of this example for preventing stick-slip and surging vibration from adversely affecting operation of the conveyor.

Operation

After installing dampeners 116 on each shaft section 62, 64 of the take-up shaft 48, the conveyor 34 is driven by the drive motor 50 to transport the pallets 36 along the length of the conveyor apparatus 30'. Upon start-up of the conveyor 34, friction conditions between the chains 38, 40 and guide rails cause that portion of each chain 38, 40 nearest the drive sprockets 42 to move along the guide rails while the chain links disposed away from the sprocket 42 remain stationary leading to the formation of stick-slip. As the chains 38, 40 begin to alternately stick and slip, the changes in the amplitude of the chain velocity of each chain 38, 40 are transmitted through each spring 120 of each dampener 116 to its flywheel 118 where the stick-slip vibration is dampened by the inertia produced by each flywheel 118 enabling a relatively constant chain velocity to be maintained. As is shown in FIG. 16, after time t=0, the amplitude, $\theta_1$, of conveyor surging decreases over time as each dampener 116 critically damps stick-slip to prevent stick-slip from exciting the chains 38, 40 into surging and dampens the surging vibrations of the chains 38, 40. After each dampener 116 has critically damped the chain surging caused by stick-slip, a negligible residual vibration at the surge frequency can remain, as is illustrated in FIG. 16, because of the effects of damping inherently present in the conveyor apparatus 30' and which does not adversely affect operation of the conveyor apparatus 30'.

What is claimed is:

1. An endless conveyor comprising: a driven sprocket, an idle sprocket, an endless flexible member received on said driven sprocket and said idle sprocket and having a length of at least eighty feet, at least one pallet operably connected to said endless flexible member for being urged by said endless flexible member, and said endless flexible member and said idle sprocket constructed and arranged to have a mass moment of inertia and a spring rate which provides the conveyor with a natural frequency greater than about twelve hertz for preventing surging vibration from adversely affecting operation of the conveyor.

2. The endless conveyor of claim 1 also comprising a drive operably associated with said driven sprocket for driving said endless flexible member at a speed not greater than 50 lineal feet per minute.

3. The endless conveyor of claim 1 wherein said mass moment of inertia is the mass moment of inertia of said idle sprocket about its axis of rotation due to the apparent mass of said idle sprocket including the apparent mass contributed by said endless flexible member and said pallet.

4. The endless conveyor of claim 3 wherein the apparent mass contributed by said pallet includes the apparent mass of said pallet when the actual mass of said pallet is about equal to the maximum payload capacity of the conveyor.

5. The endless conveyor of claim 3 wherein said endless flexible member and said idle sprocket are constructed and arranged to have a mass moment of inertia and a spring rate which provides the conveyor with a natural frequency greater than about twenty hertz.

6. The endless conveyor of claim 3 wherein said mass moment of inertia is about equal to the apparent mass of said idle sprocket multiplied by the square of the radius of said idle sprocket.

7. The endless conveyor of claim 3 also comprising a rail adjacent said endless flexible member for guiding and supporting said endless flexible member and whereby the apparent mass contributed by said endless flexible member to the apparent mass of said idle sprocket includes the force of friction between said endless flexible member and said rail in a direction generally parallel to the longitudinal axis of said rail and the apparent mass contributed by said pallet includes the force of friction between said pallet and said endless flexible member in a direction generally parallel to the longitudinal axis of said rail.

8. The endless conveyor of claim 7 wherein said apparent mass of said endless flexible member includes the sum of the normal forces exerted on said rail by said endless flexible member at each point of contact in transverse cross-section of said endless flexible member between said rail and said endless flexible member multiplied by the coefficient of friction between said rail and said endless flexible member and said apparent mass of said pallet includes the normal force exerted on said endless flexible member by said pallet multiplied by the coefficient of friction between said pallet and said endless flexible member.

9. The endless conveyor of claim 1 wherein said spring rate is the spring rate of said endless flexible member.

10. The endless conveyor of claim 1 wherein said endless flexible member is a roller chain in a closed loop.

11. The endless conveyor of claim 10 wherein said spring rate is the value of the linear spring rate of said chain in angular units whereby the linear spring rate of said chain is about equal to the average transverse cross sectional area of said chain multiplied by the Young's modulus of the material of said chain and the product thereof divided by the length of said chain between said driven sprocket and said idle sprocket.

12. The endless conveyor of claim 1 wherein said natural frequency is the square root of the product of said spring rate divided by said mass moment of inertia.

13. The endless conveyor of claim 1 also comprising a tension adjuster operably associated with said endless flexible member for adjusting and fixing the tension of said endless flexible member and said tension adjuster being isolated from said endless flexible member during conveyor operation for preventing said tension adjuster from increasing the amplitude of surging vibration during operation.

14. An endless conveyor comprising: at least one driven sprocket, at least two idle sprockets, a pair of spaced apart endless flexible members in operable communication with said driven sprocket and said idle sprockets and each said endless flexible member having a length of at least eighty feet, a drive operably associated with said driven sprocket for driving at least one endless flexible member at a speed not greater than 50 feet per minute, a pallet operably connected to said endless flexible members for being urged by said endless flexible members, and said endless flexible members and said idle sprockets constructed and arranged to have a mass moment of inertia and a spring rate which provides the conveyor with a natural frequency greater than about twelve hertz for preventing surging vibration from adversely affecting operation of the conveyor.

15. The endless conveyor of claim 14 wherein said spring rate is the value of the linear spring rate of said endless flexible members in angular units, the linear spring rate being about equal to the total of the average transverse cross sectional areas of both endless flexible members multiplied by the Young's modulus of the material of said endless flexible members and the product thereof divided by the length of one of said endless flexible members between said drive sprocket and said idle sprocket, said mass moment of inertia is about equal to the apparent mass of said idle sprockets including the apparent mass contributed to said idle sprockets by said endless flexible members and the apparent mass contributed to said idle sprockets by said pallet when the actual mass of said pallet is about equal to the maximum payload capacity of the conveyor and said apparent mass of said idle sprockets multiplied by the square of the radius of said idle sprockets, and said natural frequency is about equal to the square root of the result of said spring rate divided by said mass moment of inertia.

16. The endless conveyor of claim 14 wherein said idle sprockets are independently journalled for relative rotation therewith to prevent torsion wind-up and vibration, and each said endless flexible member and each said idle sprocket operably communicating with said flexible member is constructed and arranged to have a mass moment of inertia and a spring rate which provides the conveyor with a natural frequency of greater than about twelve hertz for preventing surging vibration from adversely affecting operation of the conveyor.

17. The endless conveyor of claim 16 wherein said spring rate is the value of the linear spring rate of one of said endless flexible members in angular units, the linear spring rate being about equal to the total of the average transverse cross sectional area of one of said endless flexible members multiplied by the Young's modulus of the material of said endless flexible members and the product thereof divided by the length of said endless flexible member between said drive sprocket and said idle sprocket, said mass moment of inertia is about equal to the apparent mass of said idle sprocket operably communicating with said endless flexible member including the apparent mass contributed to said idle sprocket by said endless flexible member and the apparent mass contributed to said idle sprocket by said pallet when the actual mass of said pallet is about equal to the maximum payload capacity of the conveyor and said apparent mass of said idle sprocket multiplied by the square of the radius of said idle sprockets, and said natural frequency of the conveyor is about equal to the square root of the result of said spring rate divided by said mass moment of inertia.

18. The endless conveyor of claim 14 wherein said endless flexible members have upper and lower runs connected at the ends of the conveyor by curved sections thereof and also comprising a pallet transfer mechanism for positively propelling said pallet over at least one of said curved sections from one of said runs to the other of said runs.

19. An endless conveyor comprising: a driven sprocket, an idle sprocket, an endless flexible member received on said driven sprocket and said idle sprocket, a drive in operable communication with said driven sprocket for driving said endless flexible member, a pallet operably connected to said endless flexible member for being urged by said endless flexible member, and a dampener in operable communication with said idle sprocket for preventing surging vibration from adversely affecting the operation of the conveyor.

20. The endless conveyor of claim 19 wherein said dampener comprises a flywheel coupled to said idle sprocket by a spring.

21. The endless conveyor of claim 20 wherein said flywheel is constructed and arranged to have a mass that provides a mass moment of inertia about its axis of rotation that is at least one-tenth the mass moment of inertia of the conveyor when said dampener is removed from the conveyor, and said mass moment of inertia of the conveyor is the mass moment of inertia of said idle sprocket about its axis of rotation due to the apparent mass of said idle sprocket including the apparent mass contributed by said endless flexible member and the apparent mass contributed by said pallet.

22. The endless conveyor of claim 19 also comprising: at least one driven sprocket, a pair of idle sprockets independently journalled to prevent torsion wind-up and vibration, a pair of spaced apart endless flexible members in operable communication with said driven sprocket and said idle sprockets, said pallet operably connected to said endless flexible members for being urged by said endless flexible members, and a dampener in operable communication with each said idle sprocket for preventing surging vibration from adversely affecting the operation of the conveyor.

23. The endless conveyor of claim 19 also comprising a tension adjuster operably associated with said endless flexible member for adjusting and fixing the tension of said endless flexible member and said tension adjuster being isolated from said endless flexible member during conveyor operation for preventing said tension adjuster from increasing the amplitude of surging vibration during operation.

24. In an endless conveyor having a driven sprocket, an idle sprocket, an endless flexible member received on said driven sprocket and said idle sprocket, a pallet operably connected to said endless flexible member for being urged by said endless flexible member, and said endless flexible member surging at a particular frequency, a dampener comprising a flywheel coupled to said idle sprocket by a spring, and said flywheel and spring constructed and arranged to have a mass moment of inertia and a spring rate which provides said dampener with a natural frequency about equal to said surge frequency for preventing surging vibration from adversely affecting the operation of the conveyor.

25. A method of reducing surging vibration an endless conveyor comprising: providing a driven sprocket, an idle sprocket, an endless flexible member received on the driven sprocket and the idle sprocket and having a length of at least eighty feet, a pallet operably connected to the endless flexible member for being urged by the endless flexible member, providing the endless flexible member and idle sprocket with a mass moment of inertia and the endless flexible member with a spring rate that produces a conveyor having a natural frequency greater than about twelve hertz for preventing surging vibration from adversely affecting operation of the conveyor.

26. The method of claim 25 comprising providing the endless flexible member with a spring rate which produces a conveyor having a natural frequency greater than about 20 hertz for preventing the endless flexible member from surging during operation of the conveyor when the mass of the pallet is about equal to the maximum payload capacity of the conveyor.

27. The method of claim 25 wherein the endless flexible member is a roller chain.

28. A method of reducing surging vibration in an endless conveyor comprising: providing a driven sprocket, an idle sprocket, an endless flexible member received on the driven sprocket and the idle sprocket and having a length of at least eighty feet, a drive operably associated with the driven sprocket for driving the endless flexible member at a speed not greater than 50 feet per minute, a pallet operably connected to the endless flexible member for being urged by the endless flexible member; and
(a) selecting an endless flexible member;
(b) determining the spring constant for the endless flexible member;
(c) determining the mass moment of inertia of the endless flexible member and idle sprocket;
(d) determining the natural frequency of the conveyor;
(e) if the natural frequency of the conveyor is less than about twelve hertz then selecting another endless flexible member and thereafter repeating steps (b), (c) and (d); and
(f) constructing the conveyor with the endless flexible member providing the conveyor with a natural frequency of greater than about twelve hertz for preventing surging vibration from adversely affecting operation of the conveyor.

29. The method of claim 28 comprising during step (e) if the natural frequency of the conveyor is less than twelve hertz then increasing the cross-sectional area of the endless flexible member to increase the spring rate of the endless flexible member for increasing the natural frequency of the conveyor.

30. The method of claim 28 comprising during step (e) if the natural frequency of the conveyor is less than twelve hertz then selecting an endless flexible member constructed of a material having a higher Young's modulus to provide an endless flexible member having a higher spring rate for increasing the natural frequency of the conveyor.

31. The method of claim 28 wherein the mass moment of inertia of the conveyor is the mass moment of inertia of the idle sprocket about its axis of rotation due to the apparent mass of the idle sprocket including the apparent mass contributed by the endless flexible member and the apparent mass contributed by the pallet.

32. The method of claim 31 wherein the apparent mass contributed by the pallet includes the apparent mass of the pallet when the actual mass of the pallet is about equal to the maximum payload capacity of the conveyor.

33. A method of reducing surging vibration in an endless conveyor comprising: providing an idle sprocket, an endless flexible member received on the driven sprocket and the idle sprocket, a drive operably associated with the driven sprocket for driving the endless flexible member, a pallet operably connected to the endless flexible member for being urged by the endless flexible member, and the endless flexible member surging at a particular frequency, and a dampener comprising a flywheel coupled to the idle sprocket by a spring; and
(a) measuring the frequency of surging of the endless flexible member;
(b) determining the mass moment of inertia of the conveyor;
(c) providing a flywheel having at least one-tenth the moment of inertia of the conveyor; and
(d) tuning the natural frequency of the dampener to be about equal to the surge frequency of the conveyor; and
(e) mounting the dampener on the conveyor with the flywheel coupled to the idle sprocket by the spring.

34. The method of claim 33 wherein the mass moment of inertia of the conveyor is the mass moment of inertia of the idle sprocket about its axis of rotation due to the apparent mass of the idle sprocket including the apparent mass contributed by the endless flexible member and the apparent mass contributed by the pallet.

35. The method of claim 34 wherein the apparent mass contributed by the pallet includes the apparent mass of the pallet when the actual mass of the pallet is about equal to the maximum payload capacity of the conveyor.

36. The method of claim 33 also comprising after step (d) determining the two new natural frequencies of the conveyor with the dampener operably connected to the idle sprocket of the conveyor and after step (e), driving the endless flexible member at a speed that will not cause vibration at either new natural frequency.

37. The method of claim 33 wherein in step (c) the mass of the flywheel is selected to provide the flywheel with at least one-fifth the inertia of the conveyor for providing the dampener with a broader bandwidth of surging vibration suppression.

38. The method of claim 33 also comprising in step (d) providing a spring having a spring rate that tunes the natural frequency of the dampener about equal to the surge frequency of the conveyor.

39. A method of reducing surging vibration in an endless conveyor comprising: providing an idle sprocket, an endless flexible member received on the driven sprocket and idle sprocket, a drive operably associated with the driven sprocket for driving the endless flexible member, a pallet operably connected to the endless flexible member for being urged by the endless flexible member, and a dampener comprising a flywheel coupled to the idle sprocket by a spring; and (a) providing the flywheel with a mass that provides a mass moment of inertia about the axis of rotation of the flywheel that is at least one-tenth the mass moment of inertia of the conveyor;

(b) tuning the natural frequency of the dampener to a frequency within a range of known surging frequencies; and (c) coupling the dampener to the idle sprocket.

40. The method of claim 39 wherein in step (a) the mass of the flywheel is selected to provide the flywheel with at least one-fifth the mass moment inertia of the conveyor for providing the dampener with a wide bandwidth of surge suppression for preventing surging vibration from adversely affecting operation of the conveyor even if the dampener is not precisely tuned to the surge frequency of the conveyor.

41. The method of claim 39 also comprising in step (b) providing a spring having a spring rate that tunes the dampener to a natural frequency within the range of known surging frequencies.

42. The method of claim 39 wherein the range of surging frequencies is about 6 to 14 hertz.

* * * * *